US012596216B2

(12) United States Patent
Stover et al.

(10) Patent No.: US 12,596,216 B2
(45) Date of Patent: Apr. 7, 2026

(54) OPTICAL FILM

(71) Applicant: 3M INNOVATIVE PROPERTIES COMPANY, St. Paul, MN (US)

(72) Inventors: Carl A. Stover, St. Paul, MN (US); Lin Zhao, Woodbury, MN (US); Gilles J. Benoit, Minneapolis, MN (US); Robert D. Taylor, Stacy, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 739 days.

(21) Appl. No.: 17/996,540

(22) PCT Filed: May 4, 2021

(86) PCT No.: PCT/IB2021/053753
§ 371 (c)(1),
(2) Date: Oct. 19, 2022

(87) PCT Pub. No.: WO2021/224799

PCT Pub. Date: Nov. 11, 2021

(65) Prior Publication Data

US 2023/0204839 A1     Jun. 29, 2023

Related U.S. Application Data

(60) Provisional application No. 63/021,743, filed on May 8, 2020.

(51) Int. Cl.
*G02B 5/30* (2006.01)
*B32B 27/08* (2006.01)
(Continued)

(52) U.S. Cl.
CPC .............. *G02B 5/305* (2013.01); *B32B 27/08* (2013.01); *B32B 27/36* (2013.01); *B32B 27/365* (2013.01);
(Continued)

(58) Field of Classification Search
None
See application file for complete search history.

(56) References Cited

U.S. PATENT DOCUMENTS 5,882,774 A    3/1999  Jonza et al.
6,179,948 B1   1/2001  Merrill et al.
(Continued)

FOREIGN PATENT DOCUMENTS

JP        2016066063 A    4/2016
JP        2016168833 A    9/2016
(Continued)

OTHER PUBLICATIONS

International Search Report for PCT International Application No. PCT/IB2021/053753, mailed on Jul. 6, 2021, 4 pages.
(Continued)

*Primary Examiner* — Derek S. Chapel
(74) *Attorney, Agent, or Firm* — Clifton F. Richardson

(57) ABSTRACT

An optical film includes a plurality of polymeric layers. A plot of an average layer thickness versus a layer number of the polymeric layers includes a knee region separating a left region including at least N1 sequentially arranged polymeric layers where the polymeric layers have lower layer numbers from a middle region including at least N2 sequentially arranged polymeric layers where the polymeric layers have higher layer numbers. N1 is greater than about 50 and N2 is greater than about 10. A linear fit to the at least N1 sequentially arranged polymeric layers in the left region has a positive linear slope having a magnitude of greater than about 0.04 nm per layer number, and a linear fit to the at least N2 sequentially arranged polymeric layers in the middle region has a negative linear slope having a magnitude of greater than about 0.05 nm per layer number.

18 Claims, 29 Drawing Sheets

(51) Int. Cl.
 *B32B 27/36* (2006.01)
 *G02F 1/1333* (2006.01)
(52) U.S. Cl.
 CPC ....... *B32B 2250/05* (2013.01); *B32B 2250/24* (2013.01); *B32B 2307/42* (2013.01); *B32B 2307/732* (2013.01); *B32B 2551/00* (2013.01); *G02F 1/13338* (2013.01)

(56) References Cited

U.S. PATENT DOCUMENTS

| | | | |
|---|---|---|---|
| 6,783,349 B2 | 8/2004 | Neavin et al. | |
| 6,967,778 B1 | 11/2005 | Wheatley et al. | |
| 9,162,406 B2 | 10/2015 | Neavin et al. | |
| 9,441,809 B2 | 9/2016 | Nevitt et al. | |
| 9,551,818 B2 | 1/2017 | Weber et al. | |
| 12,461,291 B2* | 11/2025 | Long | B32B 27/30 |
| 2010/0330350 A1* | 12/2010 | Osada | B32B 27/302 |
| | | | 428/213 |
| 2014/0254125 A1 | 9/2014 | Nevitt et al. | |
| 2014/0268346 A1 | 9/2014 | Weber et al. | |
| 2023/0266515 A1* | 8/2023 | Long | B32B 27/30 |
| | | | 359/580 |
| 2023/0273359 A1* | 8/2023 | Stover | G02B 5/0841 |
| | | | 359/485.03 |

FOREIGN PATENT DOCUMENTS

| | | | |
|---|---|---|---|
| JP | 2016534407 A | | 11/2016 |
| WO | 1997001780 A1 | | 1/1997 |
| WO | 1999036809 A1 | | 7/1999 |
| WO | 2009096298 A1 | | 8/2009 |
| WO | 2013059228 A1 | | 4/2013 |
| WO | 2013059231 A1 | | 4/2013 |
| WO | 2018163009 A1 | | 9/2018 |
| WO | 2019069214 A2 | | 4/2019 |
| WO | 2020066666 A1 | | 4/2020 |
| WO | 2020066667 A1 | | 4/2020 |
| WO | 2020066668 A1 | | 4/2020 |
| WO | 2021224703 A1 | | 11/2021 |
| WO | 2021224715 A1 | | 11/2021 |
| WO | 2021224716 A1 | | 11/2021 |
| WO | 2021224735 A1 | | 11/2021 |
| WO | 2021224761 A1 | | 11/2021 |
| WO | 2021224782 A1 | | 11/2021 |
| WO | 2021224798 A1 | | 11/2021 |

OTHER PUBLICATIONS

Long et al: Optical Stack And Housing For Electronic Device—U.S. Appl. No. 19/289,270, filed Aug. 4, 2025.

* cited by examiner $$y = 0.0011x^2 - 2.3863x + 1365.4$$
$$R^2 = 0.7958$$

Wavelength (nm)

Transmission (%)

Tmin

—— Reflective Polarizer 7   ----- Reflective Polarizer 8   ········· Reflective Polarizer 9

OPTICAL FILM

CROSS REFERENCE TO RELATED APPLICATIONS

This application is a national stage filing under 35 U.S.C. 371 of PCT/IB2021/053753, filed May 4, 2021, which claims the benefit of U.S. Application No. 63/021,743, filed May 8, 2020, the disclosures of which are incorporated by reference in their entirety herein.

BACKGROUND

Optical films, such as reflective polarizer films and mirror films, can include alternating polymeric layers.

SUMMARY

The present disclosure is generally related to optical films. An optical film can include a plurality of polymeric layers. The optical film can be a reflective polarizer or an optical mirror, for example.

In some aspects of the present disclosure, an optical film including a plurality of polymeric layers arranged along at least a portion of a thickness of the optical film and sequentially numbered from 1 to N is provided. N is an integer greater than about 100. The plurality of polymeric layers includes a polymeric end layer at each end thereof. A plot of an average layer thickness versus a layer number of the plurality of polymeric layers includes a first knee region separating a left region including at least N1 sequentially arranged polymeric layers, N1 being an integer greater than about 50, where the polymeric layers have lower layer numbers, from a middle region including at least N2 sequentially arranged polymeric layers, N2 being an integer greater than about 10, where the polymeric layers have higher layer numbers, such that a linear fit to the at least N1 sequentially arranged polymeric layers in the left region has a positive linear slope having a magnitude of greater than about 0.04 nm per layer number with an r-squared value of greater than about 0.8, and a linear fit to the at least N2 sequentially arranged polymeric layers in the middle region has a negative linear slope having a magnitude of greater than about 0.05 nm per layer number with an r-squared value of greater than about 0.8.

In some aspects of the present disclosure, an optical film including a plurality of polymeric layers including a polymeric end layer at each end thereof is provided. The polymeric end layers and each layer therebetween can have an average thickness less than about 300 nm. A plot of an average layer thickness versus a layer number of the plurality of polymeric layers includes: a left region including at least N4 sequentially arranged polymeric layers, N4 being an integer greater than about 5; a first middle region including at least N1 sequentially arranged polymeric layers, N1 being an integer greater than about 50; a second middle region including at least N2 sequentially arranged polymeric layers, N2 being an integer greater than about 10; and a right region including at least N3 sequentially arranged polymeric layers, N3 being an integer greater than about 3, such that a linear fit to the at least N4 sequentially arranged polymeric layers in the left region has a negative linear slope having a magnitude of greater than about 0.04 nm per layer number with an r-squared value of greater than about 0.8, a linear fit to the at least N1 sequentially arranged polymeric layers in the first middle region has a positive linear slope having a magnitude of greater than about 0.04 nm per layer number with an r-squared value of greater than about 0.8, a linear fit to the at least N2 sequentially arranged polymeric layers in the second middle region has a negative linear slope having a magnitude of greater than about 0.05 nm per layer number with an r-squared value of greater than about 0.8, and a linear fit to the at least N3 sequentially arranged polymeric layers in the right region has a positive linear slope having a magnitude of greater than about 1.2 nm per layer number with an r-squared value of greater than about 0.6.

In some aspects of the present disclosure, an optical film including a plurality of polymeric layers arranged along at least a portion of a thickness of the optical film and sequentially numbered from 1 to N is provided. N is an integer greater than about 100. The plurality of polymeric layers includes a polymeric end layer at each end thereof. The polymeric end layers and each layer therebetween can have an average thickness less than about 300 nm. An mth layer in the plurality of the polymeric layer has an average thickness tm, m<N, such that an average thickness of each polymeric layer in the plurality of polymeric layers having a layer number n, m≤n≤N, is within about 10% of $$tm - A\,e^{\frac{-(N-n)}{d}},$$

where A is a real number, 0.01 tm≤A≤0.25 tm, and d is an integer, 0.005N≤d≤0.1N.

In some aspects of the present disclosure, an optical film including a plurality of polymeric layers arranged along at least a portion of a thickness of the optical film and sequentially numbered from 1 to P is provided. P is an integer greater than about 100. The plurality of polymeric layers includes a polymeric end layer at each end thereof. The polymeric end layers and each layer therebetween can have an average thickness less than about 300 nm. A plot of an average layer thickness versus a layer number of the plurality of polymeric layers includes a first knee region separating a left region including at least P1 sequentially arranged polymeric layers, P1 being an integer greater than about 50, where the polymeric layers have lower layer numbers, from a right region including at least P2 sequentially arranged polymeric layers, P2 being an integer greater than about 10, where the polymeric layers have higher layer numbers, such that a linear fit to the at least P2 sequentially arranged polymeric layers in the right region has a negative linear slope having a magnitude of greater than about 0.1 nm per layer number with an r-squared value of greater than about 0.8. For a substantially normally incident light having a first polarization state, an optical transmittance of the optical film versus wavelength includes a band edge between about 850 nm and about 950 nm, such that a best linear fit to the band edge correlating the optical transmittance to the wavelength at least across a wavelength range where the optical transmittance increases from about 10% to about 70% has a slope of greater than about 3%/nm with an r-squared value of greater than about 0.8.

In some aspects of the present disclosure, an optical film including a plurality of polymeric layers arranged along at least a portion of a thickness of the optical film and sequentially numbered from 1 to N is provided. N is an integer greater than about 200. The plurality of polymeric layers includes a polymeric end layer at each end thereof. The polymeric end layers and each layer therebetween can have an average thickness less than about 300 nm. A plot of an average layer thickness versus a layer number of the plurality of polymeric layers includes a knee region separating a left region including at least Q1 sequentially arranged polymeric layers, Q1 being an integer greater than about 100, where the polymeric layers have lower layer numbers, from a right region including at least Q2 sequentially arranged polymeric layers, Q2 being an integer greater than about 10, where the polymeric layers have higher layer numbers, such that a linear fit to the at least Q1 sequentially arranged polymeric layers in the left region has a positive linear slope having a magnitude of greater than about 0.04 nm per layer number with an r-squared value of greater than about 0.8, and a linear fit to the at least Q2 sequentially arranged polymeric layers in the right region has a negative linear slope having a sufficiently large magnitude so that for a substantially normally incident light having a first polarization state, an optical transmittance of the optical film versus wavelength includes a band edge between about 800 nm and about 1100 nm. A best linear fit to the band edge correlating the optical transmittance to the wavelength at least across a wavelength range where the optical transmittance along the band edge increases from about 10% to at least about 80% can have a slope of greater than about 3%/nm.

In some aspects of the present disclosure, an optical film including a plurality of polymeric layers arranged along at least a portion of a thickness of the optical film and sequentially numbered from 1 to N is provided. N is an integer greater than about 200. The plurality of polymeric layers includes a polymeric end layer at each end thereof. The polymeric end layers and each layer therebetween can have an average thickness less than about 300 nm. A plot of an average layer thickness versus a layer number of the plurality of polymeric layers includes a knee region separating a left region including at least 100 sequentially arranged polymeric layers where the polymeric layers have lower layer numbers, from a right region including at least 10 sequentially arranged polymeric layers where the polymeric layers have higher layer numbers, such that a third order polynomial fit to at least 15 sequentially arranged polymeric layers including the knee region has a positive third order coefficient and a negative second order coefficient with an r-squared value of greater than about 0.8.

In some aspects of the present disclosure, an optical film including a plurality of polymeric layers sequentially numbered from 1 to N is provided. N is an integer greater than about 100. Each of the polymeric layers can have an average thickness less than about 300 nm. A plot of an average layer thickness versus a layer number of the plurality of polymeric layers includes a knee region including a thickest polymeric layer in the plurality of polymeric layers, such that for substantially normally incident light and a first wavelength range extending from about 400 nm to about 800 nm and a second wavelength range extending from about 950 nm to about 1300 nm, the plurality of polymeric layers: reflects greater than about 80% of the incident light having a first polarization state in the first wavelength range; transmits greater than about 40% of the incident light having a second polarization state, orthogonal to the first polarization state, in the first wavelength range; transmits greater than about 60% of the incident light in the second wavelength range for each of the first and second polarization states; and an optical transmittance of the optical film versus wavelength for the first polarization state includes a band edge between about 800 nm and about 1100 nm. A best linear fit to the band edge correlating the optical transmittance to the wavelength at least across a wavelength range where the optical transmittance along the band edge increases from about 10% to at least about 70% can have a slope of greater than about 3%/nm. For the substantially normally incident light and a third wavelength range extending from a smaller wavelength L1 to a greater wavelength L2, where 30 nm≤L2−L1≤50 nm and L1 is greater than and within about 20 nm of a wavelength corresponding to an optical transmittance of about 50% along the band edge, the optical transmittance has an average of greater than about 75%.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, an optical film has a layer thickness profile selected to give a desired transition between reflection and pass bands, for example. The layer thickness profiles described herein can, in some embodiments, result in an optical film having a higher transmission at near infrared wavelengths close to and larger than a band edge wavelength and/or higher reflectance at near infrared wavelengths close to and less than the band edge wavelength compared to other optical films. According to some embodiments, the optical films can advantageously be used in liquid crystal displays (LCDs), for example, where it is desired to reflect visible light for a range of incidence angles (which, due to the shift in reflection bands with increasing incidence angle, can be achieved by having a reflection band for normally incident light that extends into the near infrared) and to transmit the infrared light from an infrared light source used for fingerprint detection, for example.

Figure 1:
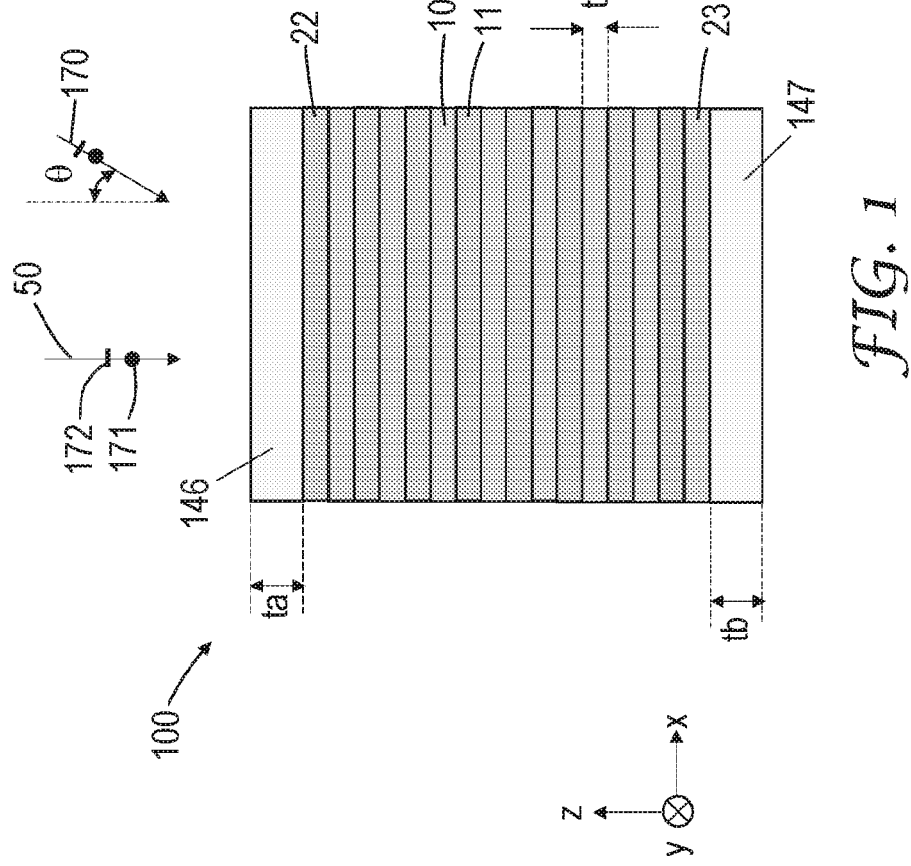
FIGS. 1-2 are schematic cross-sectional views of illustrative optical films.
Figure 2:
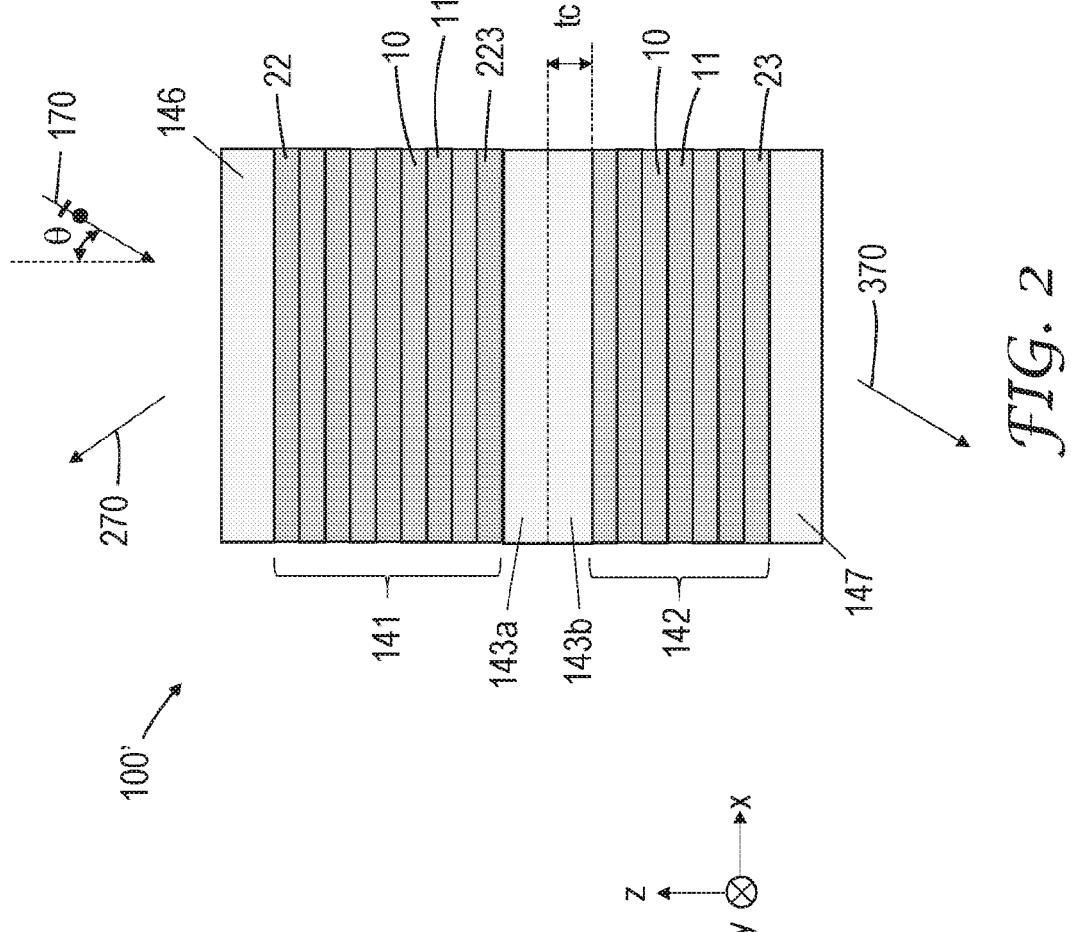

FIGS. 1-2 are schematic cross-sectional views of optical films 100 and 100', according to some embodiments. The optical film 100, 100' includes a plurality of polymeric layers 10, 11 arranged along at least a portion of a thickness (along the z-direction, referring to the illustrated x-y-z coordinate system) of the optical film. Each polymeric layer 10,11 has an average thickness t which may be less than about 300 nm.

The number of polymeric layers 10, 11 in the optical film 100 or 100' can be substantially larger than schematically illustrated in FIGS. 1-2. For example, the plurality of polymeric layers 10, 11 can include 50 to 800 layers in total. In some embodiments, the plurality of polymeric layers 10, 11 includes greater than about 100 layers or greater than about 200 layers. The optical films 100, 100' include outermost layers 146 and 147 which have thicknesses ta and tb, respectively. Each thickness ta, tb can be greater than about 500 nm, or greater than about 1 micrometer, or greater than about 2 micrometers, or greater than about 3 micrometers, or greater than about 5 micrometers, for example. The thicknesses of the outermost layers 146 and 147 may have an effect on the transmission spectra of the optical film due to light reflected from surfaces of the layers 146 and 147 which may undergo optical interference with light reflected from other layers. For the optical film 100', the plurality of polymeric layers 10, 11 includes first (141) and second (142) pluralities of polymeric layers where the first and second pluralities of polymeric layers are separated from one another along the thickness of the optical film by at least one middle layer 143a, 143b, where each middle layer 143a, 143b has an average thickness tc greater than about 500 nm, or greater than about 1 micrometer, or greater than about 2 micrometers, or greater than about 3 micrometers, or greater than about 5 micrometers, for example. The at least one middle layer 143a, 143b can be two protective boundary layers, or a single layer formed from two protective boundary layers, for example. As is known in the art, protective boundary layers are often included adjacent to packets of alternating interference layers to protect the interference layers from damage during processing. Outermost layer 146 and/or 147 can be a protective boundary layer or a combination of a protective boundary layer with an additional outer skin layer, for example. The protective boundary layers may be formed in the same process as the layers 11, 12 while the skin layers may be are added down-stream after the layers have been compressed to go into a film die.

The plurality of polymeric layers 10, 11 can include alternating first and second polymeric layers 10 and 11 which may be referred to as interference layers. Interference layers may be described as reflecting and transmitting light primarily by optical interference when the reflectance and transmittance of the interference layers can be reasonably described by optical interference or reasonably accurately modeled as resulting from optical interference. As is known in the art, multilayer optical films including alternating polymeric layers can be used to provide desired reflection and transmission in desired wavelength ranges by suitable selection of layer thicknesses. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. In some embodiments, the optical film has a sharp band edge. Optical films having sharpened band edges are known in the art and are described in U.S. Pat. No. 6,967,778 (Wheatley et al.), for example.

As described further elsewhere herein, the transmittance and reflectance of the optical film 100, 100' may be specified for substantially normally incident (e.g., within 30 degrees, or 20 degrees, or 10 degrees of normally incident) light 50 and/or for light 170 having an incident angle θ (angle of incidence direction with the normal to the optical film) and may be specified for first and/or second polarization states (e.g., first and second polarization states 171 and 172). The electric field is polarized along the y-axis for first polarization state 171 and is polarized in the x-z plane for second polarization state 172 in the illustrated embodiment. In some embodiments, the optical film 100, 100' is a reflective polarizer. A pass (resp., block) polarization state of a reflective polarizer can be a p-polarization state (p-pol) or an s-polarization state (s-pol) with the projection of the electric field onto a plane (x-y plane) of the reflective polarizer being parallel to a pass (resp., block) axis of the reflective polarizer. In some embodiments, the first polarization state 171 is a block state of the reflective polarizer and the second polarization state 172 is a pass state of the reflective polarizer regardless of the plane of incidence. A portion (e.g., light 270) of the incident light 50, 170 is typically reflected and a portion (e.g., light 370) is typically transmitted. In some embodiments, for the second polarization state 172 (and/or for a pass polarization state) and a first wavelength range, the reflective polarizer has a greater average optical transmittance for light incident at a smaller incident angle (e.g., light 50) and a smaller average optical transmittance for light incident at a greater incident angle (e.g., light 170). Such reflective polarizers may be referred to as collimating reflective polarizers, since when the reflective polarizer is included in a recycling backlight, a portion of light in the pass polarization state that is incident at oblique angles is reflected by the reflective polarizer and then recycled and is eventually transmitted when incident on the reflective polarizer at a smaller incident angle. Collimating reflective polarizers are known in the art and are described in U.S. Pat. No. 9,441,809 (Nevitt et al.) and U.S. Pat. No. 9,551,818 (Weber et al.), for example. In other embodiments, the optical film 100, 100' is a mirror film substantially reflecting (e.g., average reflectance of at least about 60%, or at least about 70%, or at least about 80%) substantially normally incident light 50 in at least a visible wavelength range (e.g., 400 nm to 700 nm) for each of the first and second polarization states 171 and 172.

In some embodiments, the optical film 100 or 100' is an infrared transmissive optical film such as an infrared transmissive reflective polarizer or an infrared transmissive optical mirror. For example, the reflective polarizer or optical mirror may transmit greater than about 60% (or greater than about 70%, or greater than about 75%, or greater than about 80%) of the substantially normally incident light 50 in the wavelength range from about 950 nm to about 1200 nm or from about 950 nm to about 1300 nm for each of the orthogonal first and second polarization states 171 and 172.

Figure 3:
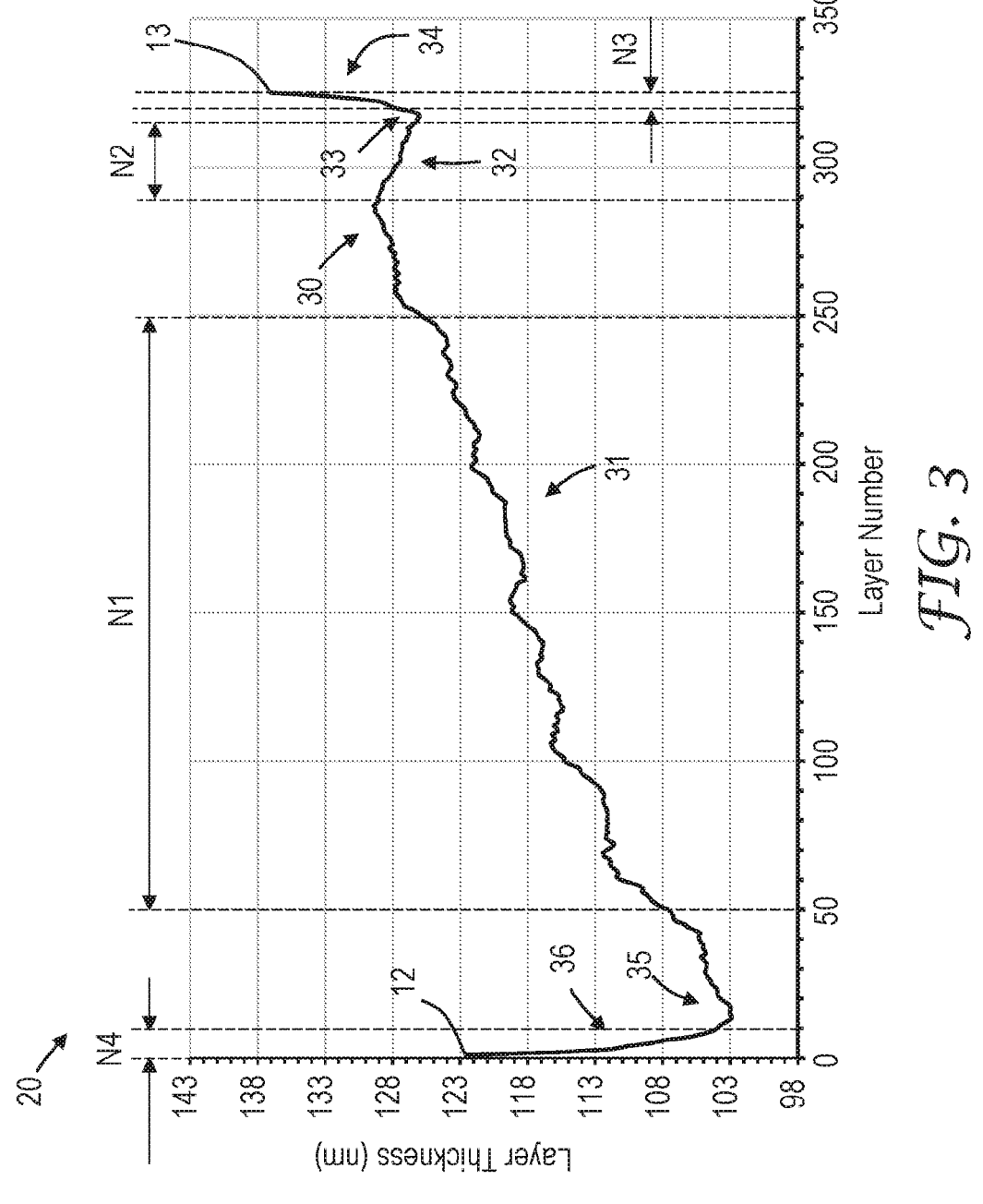
FIG. 3 is an illustrative plot of average layer thickness versus layer number for a plurality of polymeric layers where the plot has a knee region separating a middle region from a right region.
Figure 4:
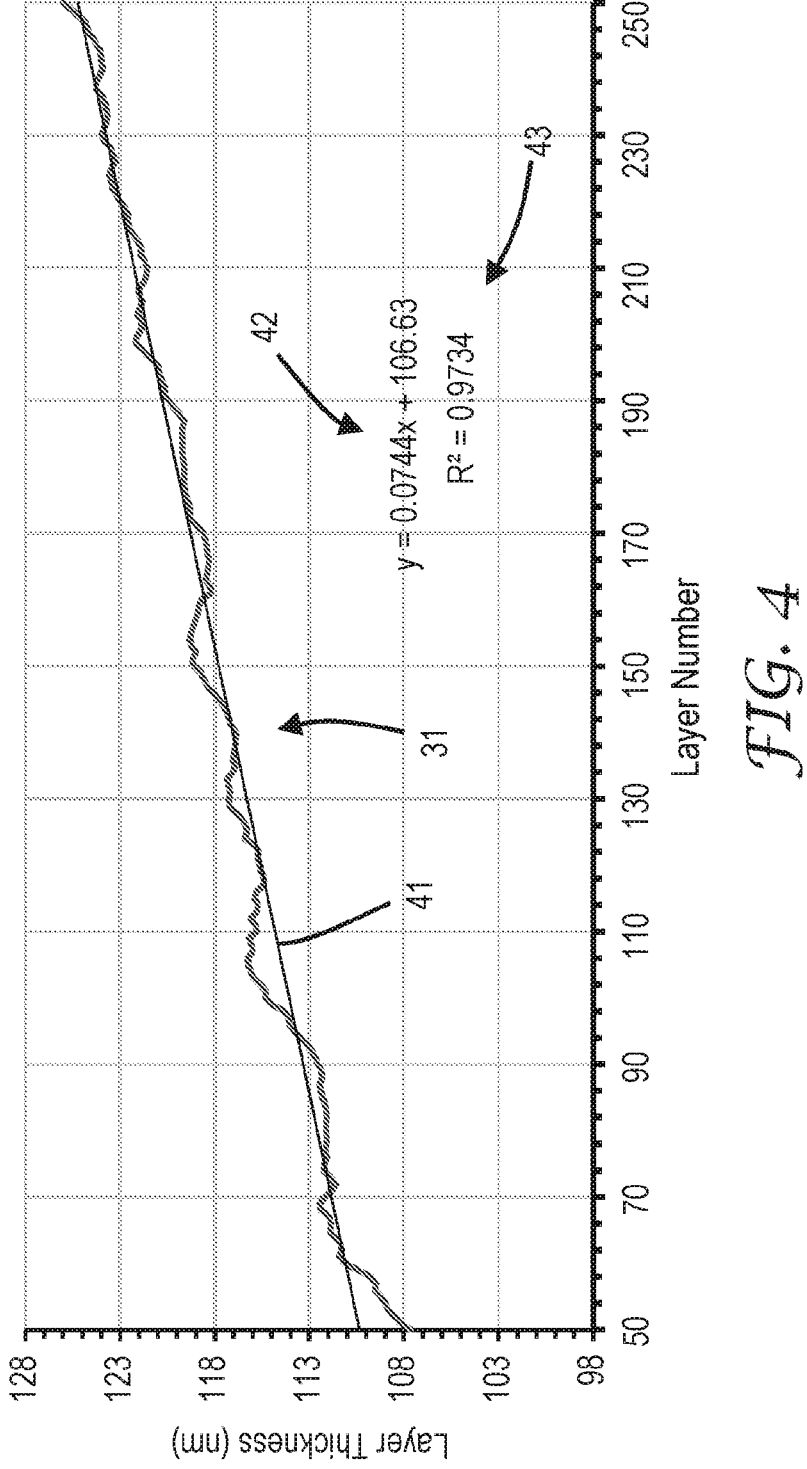
FIGS. 4-7 show portions of the plot of FIG. 3.
Figure 5:
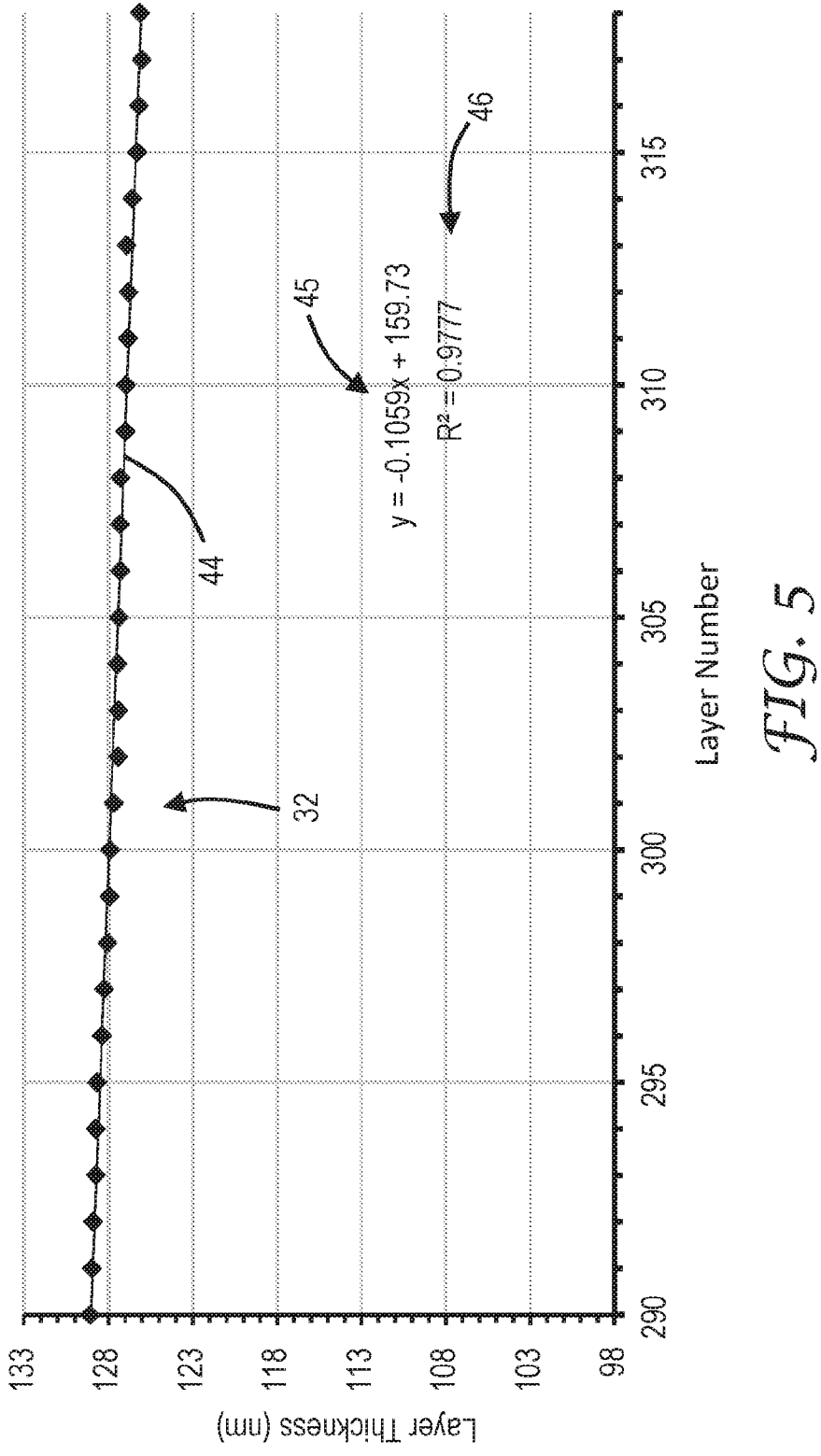
Figure 6:
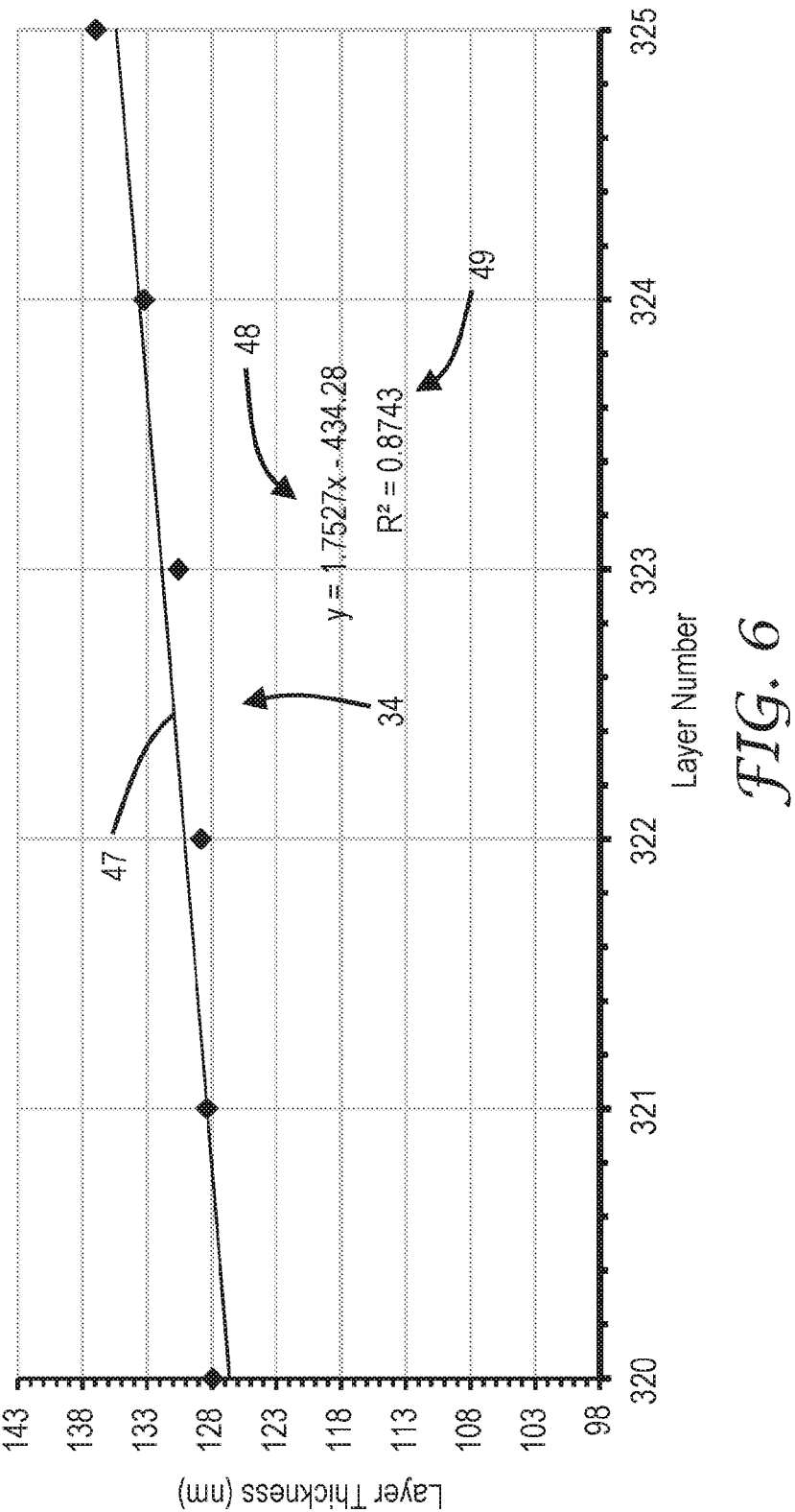
Figure 7:
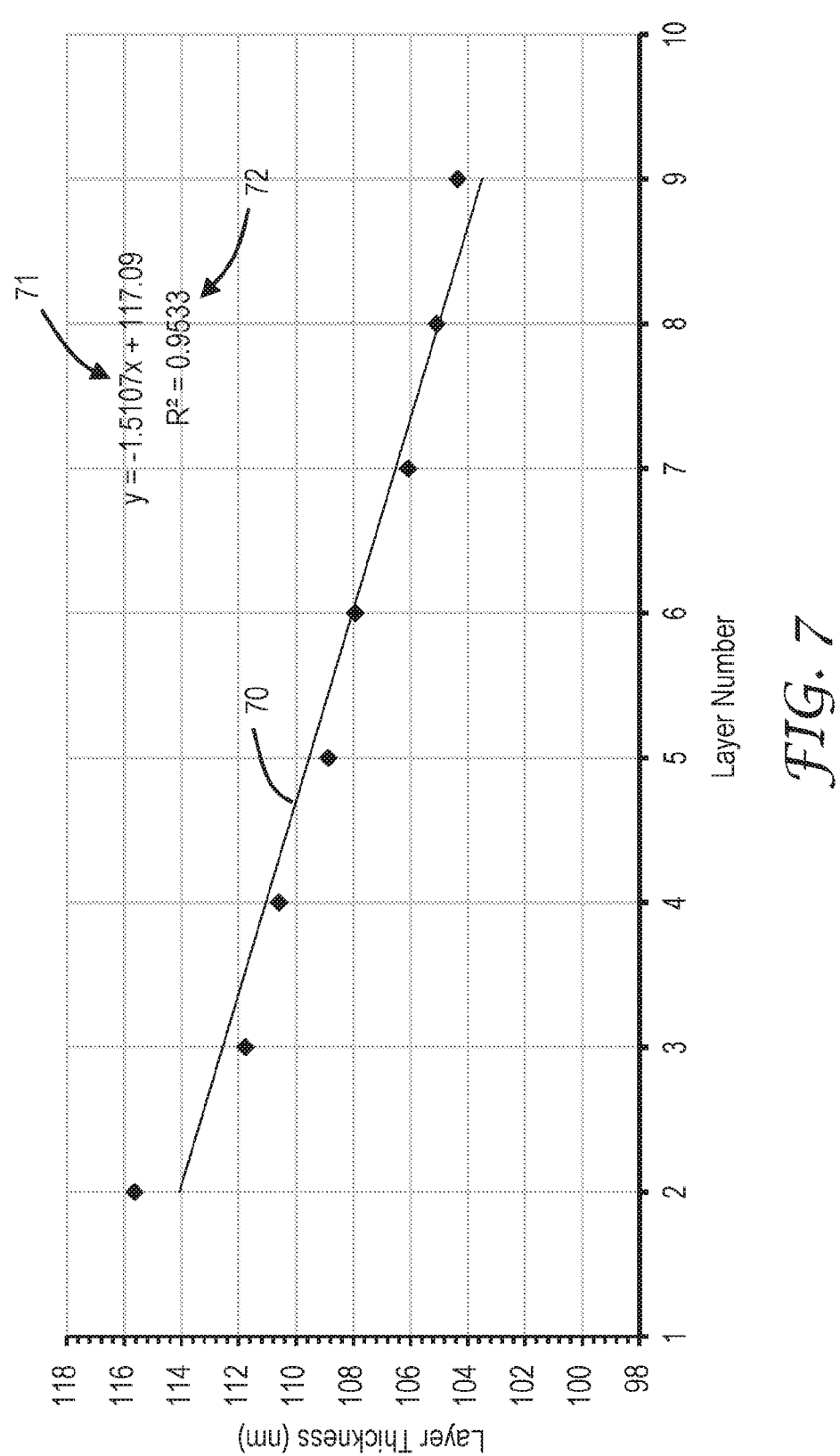

FIG. 3 is a plot 20 of average layer thickness versus layer number for a plurality of polymeric layers 10, 11, according to some embodiments. The thickness profile can be for a plurality of polymeric layers 10, 11 in an entire film or in a packet (e.g., 141 or 142) of a film. The average layer thickness is the thickness of the layer averaged (e.g., unweighted mean) over the area of the layer. FIGS. 4-7 show portions of the plot of FIG. 3. The layer thicknesses profiles can be selected through suitable feedblock design and processing. For example, the axial rod heater power levels in the multilayer feedblock described in U.S. Pat. No. 6,783,349 (Neavin et al.) can be used to control the layer thickness profile.

The average layer thicknesses can be measured using an Atomic Force Microscope (AFM). To reduce the error of the measurement, the average thickness of a layer can be determined as a moving average. The layers can be numbered from the thinnest layer to the thickest layer and the moving average can average over 20 layers including 10 layers with lower layer numbers, the specified layer, and 9 layers with higher layer numbers. Near the ends of the profile, fewer layers are used in the moving average since fewer layers before or after the specified layer are available. For example, for a film or packet with 325 layers, the average thickness of layer 1 will be the average thickness of layers 1 to 10, the average thickness of layer 2 will be the average thickness of layers 1 to 11, the average thickness of layer 101 will be the average thickness of layers 91 to 110, the average thickness of layer 325 will be the average thickness of layers 315 to 325, and the average thickness of layer 324 will be the average thickness of layers 314 to 325.

In some embodiments, an optical film 100, 100' includes a plurality of polymeric layers 10, 11 arranged along at least a portion of a thickness (z-direction) of the optical film and sequentially numbered from 1 to N, where N is an integer greater than about 100. The plurality of polymeric layers 10, 11 include a polymeric end layer 22, 23 or 22, 223 at each end thereof. In some embodiments, the polymeric end layers 22, 23 and each layer 10, 11 therebetween has an average thickness less than about 300 nm (see, e.g., FIG. 1). The optical film can optionally include at least one layer 143a, 143b (see, e.g., FIG. 2) between the polymeric end layers 22, 23 having an average thickness tc greater than about 500 nanometers or in any of the thickness ranges described elsewhere herein. Any such thick layer(s) that may be included in the optical film may be considered separate layer(s) that are not included in the plurality of polymeric layers 10, 11 and may be omitted in the sequential numbering from 1 to N. The numbering from 1 to N can alternatively refer to layers in a single packet. For example, the layers sequentially numbered from 1 to N can be the layers of the first plurality 141 of polymeric layers starting with end layer 223 and ending with end layer 22, or starting with end layer 22 and ending with end layer 223. In some embodiments, the polymeric end layers 22, 223 and each layer 10, 11 therebetween has an average thickness less than about 300 nm.

In some embodiments, a plot 20 of an average layer thickness t versus a layer number of the plurality of polymeric layers 10, 11 includes a first knee region 30 separating a left region 31 including at least N1 sequentially arranged polymeric layers where the polymeric layers have lower layer numbers, from a middle region 32 including at least N2 sequentially arranged polymeric layers where the polymeric layers have higher layer numbers, such that a linear fit 41

(see, e.g., FIG. 4) to the at least N1 sequentially arranged polymeric layers in the left region has a positive linear slope 42 having a magnitude of greater than about 0.04 nm per layer number with an r-squared value 43 of greater than about 0.8, and a linear fit 44 (see, e.g., FIG. 5) to the at least N2 sequentially arranged polymeric layers in the middle region 32 has a negative linear slope 45 having a magnitude of greater than about 0.05 nm per layer number with an r-squared value 46 of greater than about 0.8. N1 is an integer greater than about 50 (e.g., at least 47, or at least 49, or at least 50, or at least 51). In some embodiments, N1 is greater than about 100, or greater than about 150, or greater than about 180. N2 is an integer greater than about 10. In some embodiments, N2 is greater than about 15 or greater than about 20.

In some embodiments, the optical film 100, 100' further includes a second knee region 33 separating the middle region 32 from a right region 34 and including at least N3 sequentially arranged polymeric layers where the polymeric layers have higher layer numbers than the polymeric layers in the middle region, such that a linear fit 47 (see, e.g., FIG. 6) to the at least N3 sequentially arranged polymeric layers in the right region has a positive linear slope 48 having a magnitude of greater than about 1.2 nm per layer number with an r-squared value 49 of greater than about 0.6. N3 is an integer greater than about 3 (e.g., at least 3). In some embodiments, N3 is at least 3, 4, 5, or 6.

In some embodiments, an optical film 100, 100' includes a plurality of polymeric layers 10, 11 including a polymeric end layer (e.g., layers 22, 23 in optical film 100, or layers 22, 223 in optical film 100') at each end thereof. The polymeric end layers and each layer therebetween can have an average thickness less than about 300 nm. A plot 20 of an average layer thickness t versus a layer number of the plurality of polymeric layers includes: a left region 36 including at least N4 sequentially arranged polymeric layers; a first middle region 31 including at least N1 sequentially arranged polymeric layers; a second middle region 32 including at least N2 sequentially arranged polymeric layers; and a right region 34 including at least N3 sequentially arranged polymeric layers, such that a linear fit 70 (see, e.g., FIG. 7) to the at least N4 sequentially arranged polymeric layers in the left region has a negative linear slope 71 having a magnitude of greater than about 0.04 nm per layer number with an r-squared value 72 of greater than about 0.8, a linear fit 41 (see, e.g., FIG. 4) to the at least N1 sequentially arranged polymeric layers in the first middle region 31 has a positive linear slope 42 having a magnitude of greater than about 0.04 nm per layer number with an r-squared value 43 of greater than about 0.8, a linear fit 44 (see, e.g., FIG. 5) to the at least N2 sequentially arranged polymeric layers in the second middle region 32 has a negative linear slope 45 having a magnitude of greater than about 0.05 nm per layer number with an r-squared value 46 of greater than about 0.8, and a linear fit 47 (see, e.g., FIG. 6) to the at least N3 sequentially arranged polymeric layers in the right region 34 has a positive linear slope 48 having a magnitude of greater than about 1.2 nm per layer number with an r-squared value 49 of greater than about 0.6. In some embodiments, N1 is an integer greater than about 50, N2 is an integer greater than about 10, N3 is an integer greater than about 3, and N4 is an integer greater than about 5 (e.g., at least 5). N1, N2, and N3 can be in any of the ranges described elsewhere. In some embodiments, N4 is at least 5, or at least 6, or at least 7. Note that a same region may be referred to as a first region or a second region, or a middle region or a left or right region, for example, depending on other elements or regions being discussed.

In some embodiments, the positive linear slope 42 of the linear fit 41 has a magnitude of greater than about 0.05 nm per layer number, or greater than about 0.06 nm per layer number, or greater than about 0.07 nm per layer number. In some such embodiments, or in other embodiments, the r-squared value 43 of the linear fit 41 is greater than about 0.8, or greater than about 0.85, or greater than about 0.9, or greater than about 0.93, or greater than about 0.95.

In some embodiments, the negative linear slope 45 of the linear fit 44 has a has a magnitude of greater than about 0.06 nm per layer number, or greater than about 0.07 nm per layer number, or greater than about 0.08 nm per layer number. In some such embodiments, or in other embodiments, the r-squared value 46 of the linear fit 44 is greater than about 0.8, or greater than about 0.85, or greater than about 0.9, or greater than about 0.93, or greater than about 0.95.

In some embodiments, the positive linear slope 48 of the linear fit 47 has a magnitude of greater than about 1.4 nm per layer number, or greater than about 1.5 nm per layer number, or greater than about 1.6 nm per layer number. In some such embodiments, or in other embodiments, the r-squared value 49 of the linear fit 47 is greater than about 0.6, or greater than about 0.7, or greater than about 0.8, or greater than about 0.85.

In some embodiments, the negative linear slope 71 to the linear fit 70 has a magnitude of greater than about 0.1 nm per layer number, or greater than about 0.5 nm per layer number, or greater than about 0.8 nm per layer number, or greater than about 1 nm per layer number, or greater than about 1.2 nm per layer number, or greater than about 1.4 nm per layer number. In some such embodiments, or in other embodiments, the r-squared value of the linear fit 70 is greater than about 0.8, or greater than about 0.85, or greater than about 0.9, or greater than about 0.93, or greater than about 0.95.

In some embodiments, a first knee region 35 separates the left region 36 from the first middle region 31, where the polymeric layers in the first middle region 31 have higher layer numbers than the polymeric layers in the left region 36. In some such embodiments or in other embodiments, a second knee region 30 separates the first middle region 31 from the second middle region 32, where the polymeric layers in the second middle region 32 have higher layer numbers than the polymeric layers in the first middle region 31. In some such embodiments or in other embodiments, a third knee region 33 separates the second middle region 32 from the right region 34, where the polymeric layers in the right region 34 have higher layer numbers than the polymeric layers in the second middle region 32.

Figure 8:
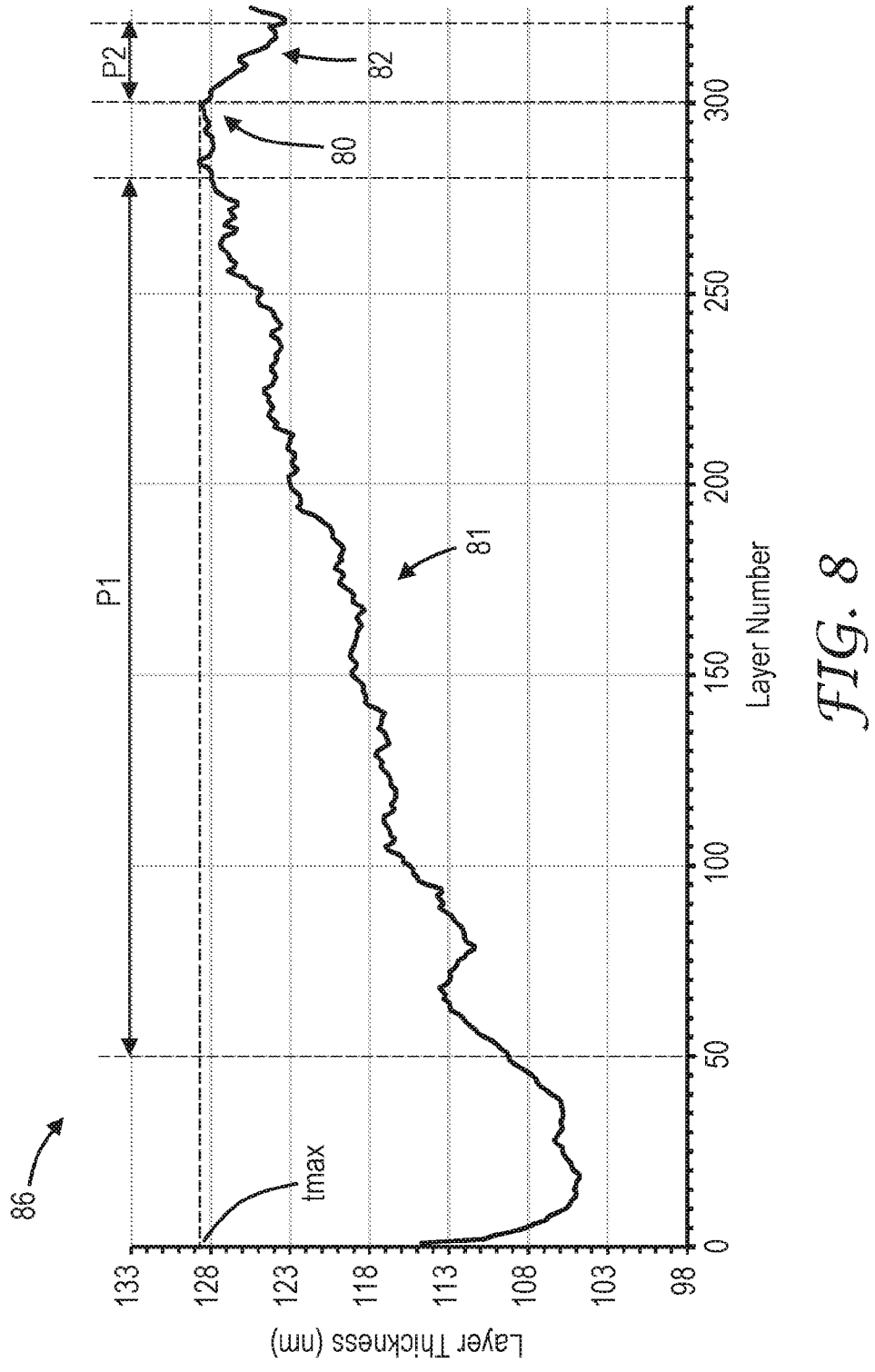
FIG. 8 is an illustrative plot of average layer thickness versus layer number for a plurality of polymeric layers where the plot has a knee region separating a left region from a right region.
Figure 9:
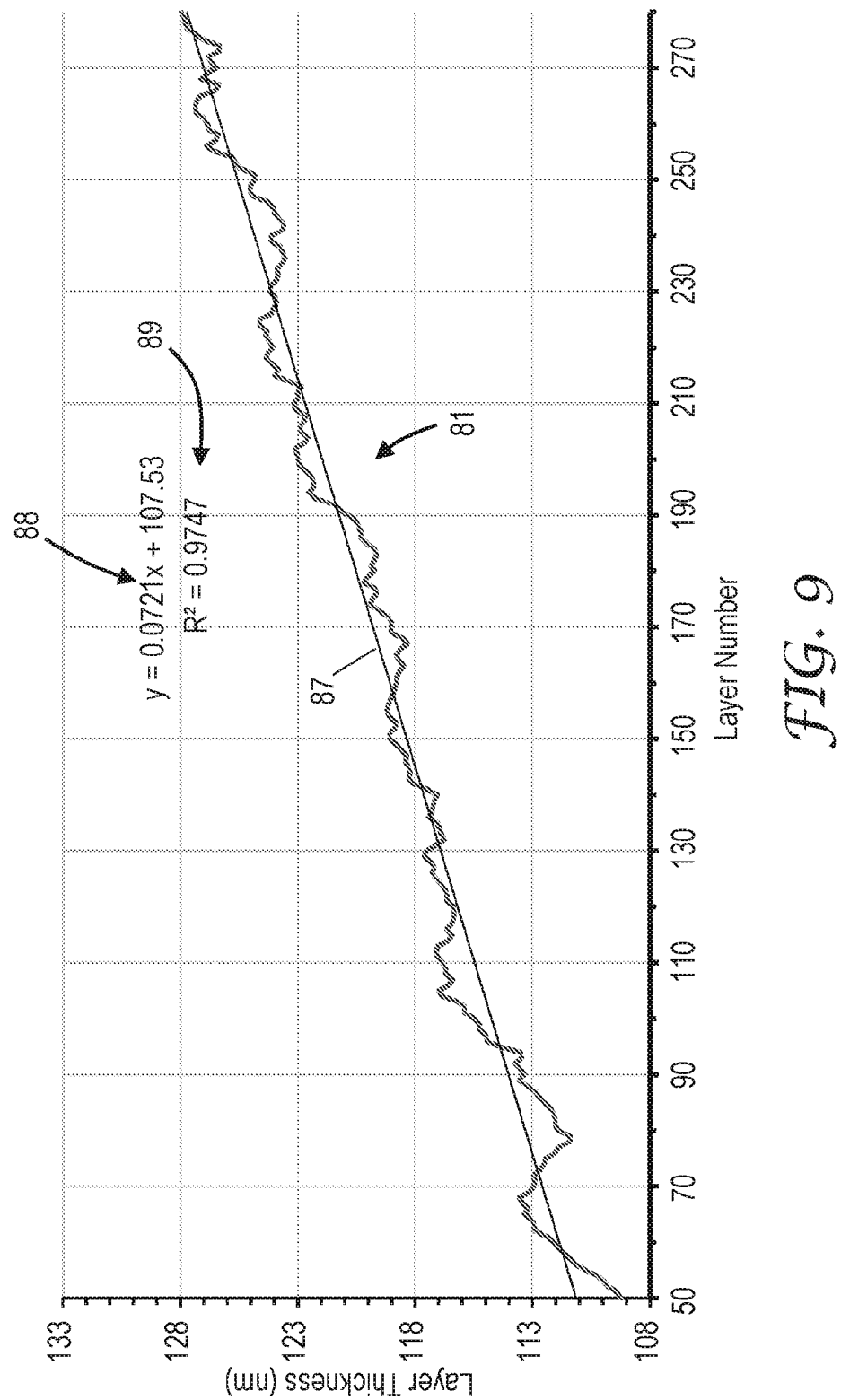
FIGS. 9-10 show portions of the plot of FIG. 8.
Figure 10:
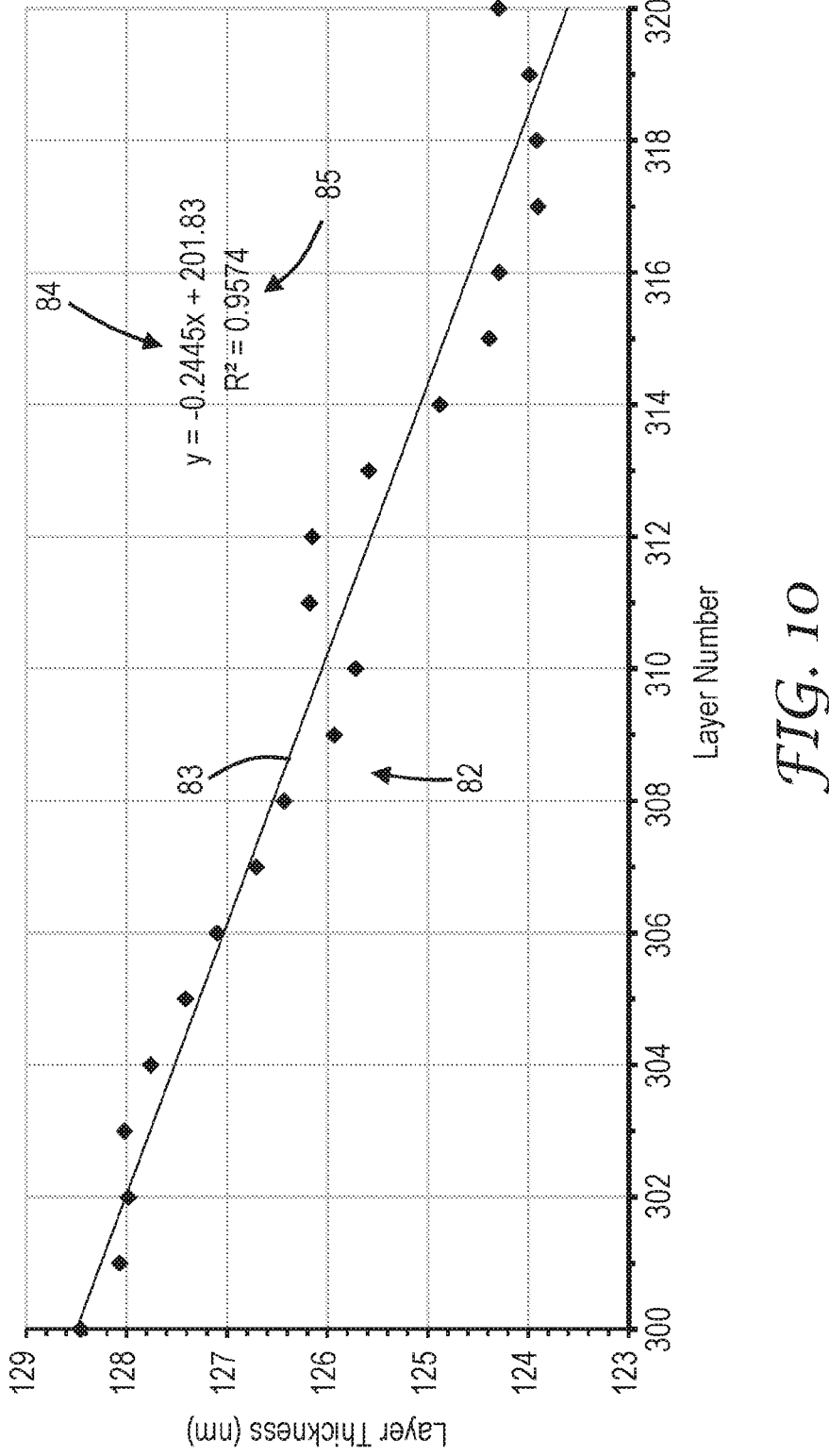

FIG. 8 is a plot 86 of average layer thickness versus layer number for a plurality of polymeric layers 10, 11, according to some embodiments. The thickness profile can be for a plurality of polymeric layers 10, 11 in an entire film or in a packet (e.g., 141 or 142) of a film. FIGS. 9-10 show portions of the plot of FIG. 8.

In some embodiments, an optical film 100, 100' includes a plurality of polymeric layers 10, 11 arranged along at least a portion of a thickness (z-direction) of the optical film and sequentially numbered from 1 to P (e.g., corresponding to sequentially numbered layers 1 to N described elsewhere). P can be an integer greater than about 100, for example. The plurality of polymeric layers 10, 11 include a polymeric end layer (e.g., layers 22, 23 in optical film 100, or layers 22, 223 in optical film 100') at each end thereof. The polymeric end layers and each layer therebetween can have an average thickness less than about 300 nm. A plot 86 of an average layer thickness t versus a layer number of the plurality of polymeric layers 10, 11 includes: a first knee region 80 separating a left region 81 including at least P1 sequentially arranged polymeric layers where the polymeric layers have lower layer numbers, from a right region 82 including at least P2 sequentially arranged polymeric layers where the polymeric layers have higher layer numbers, such that a linear fit 83 (see, e.g., FIG. 10) to the at least P2 sequentially arranged polymeric layers in the right region 82 has a negative linear slope 84 having a magnitude of greater than about 0.1 nm per layer number with an r-squared value 85 of greater than about 0.8. In some embodiments, P1 is an integer greater than about 50 and P2 is an integer greater than about 10. In some embodiments, P1 is at least 50, or at least 100, or at least 150, or at least 200. In some such embodiments or in other embodiments, P2 is at least 10, or at least 15, or at least 18.

In some embodiments, a linear fit 87 (see, e.g., FIG. 9) to the at least P1 sequentially arranged polymeric layers in the left region 81 has a positive linear slope 88 having a magnitude in a range of about 0.01 nm per layer number to about 0.25 nm per layer number with an r-squared value 89 of greater than about 0.8. In some embodiments, the linear fit 87 has a positive linear slope 88 in a range of about 0.02 nm per layer number, or about 0.03 nm per layer number, or about 0.04 nm per layer number to about 0.2 nm per layer number or to 0.15 nm per layer number. In some such embodiments or in other embodiments, the linear fit 87 has an r-squared value 89 of greater than about 0.8, or greater than about 0.85, or greater than about 0.9, or greater than about 0.93, or greater than about 0.95.

In some embodiments, the negative linear slope 84 of the linear fit 83 has a magnitude greater than about 0.15 nm per layer number, or greater than about 0.2 nm per layer number, or greater than about 0.22 nm per layer number. In some such embodiments or in other embodiments, r-squared value 85 of the linear fit 83 of greater than about 0.8, or greater than about 0.85, or greater than about 0.9, or greater than about 0.93, or greater than about 0.95.

In some embodiments, an optical film 100, 100' includes a plurality of polymeric layers 10, 11 arranged along at least a portion of a thickness of the optical film and sequentially numbered from 1 to N, where N is an integer greater than about 100 or greater than about 200. The plurality of polymeric layers includes a polymeric end layer (e.g., layers 22, 23 in optical film 100, or layers 22, 223 in optical film 100') at each end thereof, where the polymeric end layers and each layer therebetween has an average thickness less than about 300 nm. The optical film can have a layer thickness profile as shown in FIGS. 11-14, for example.

Figure 11:
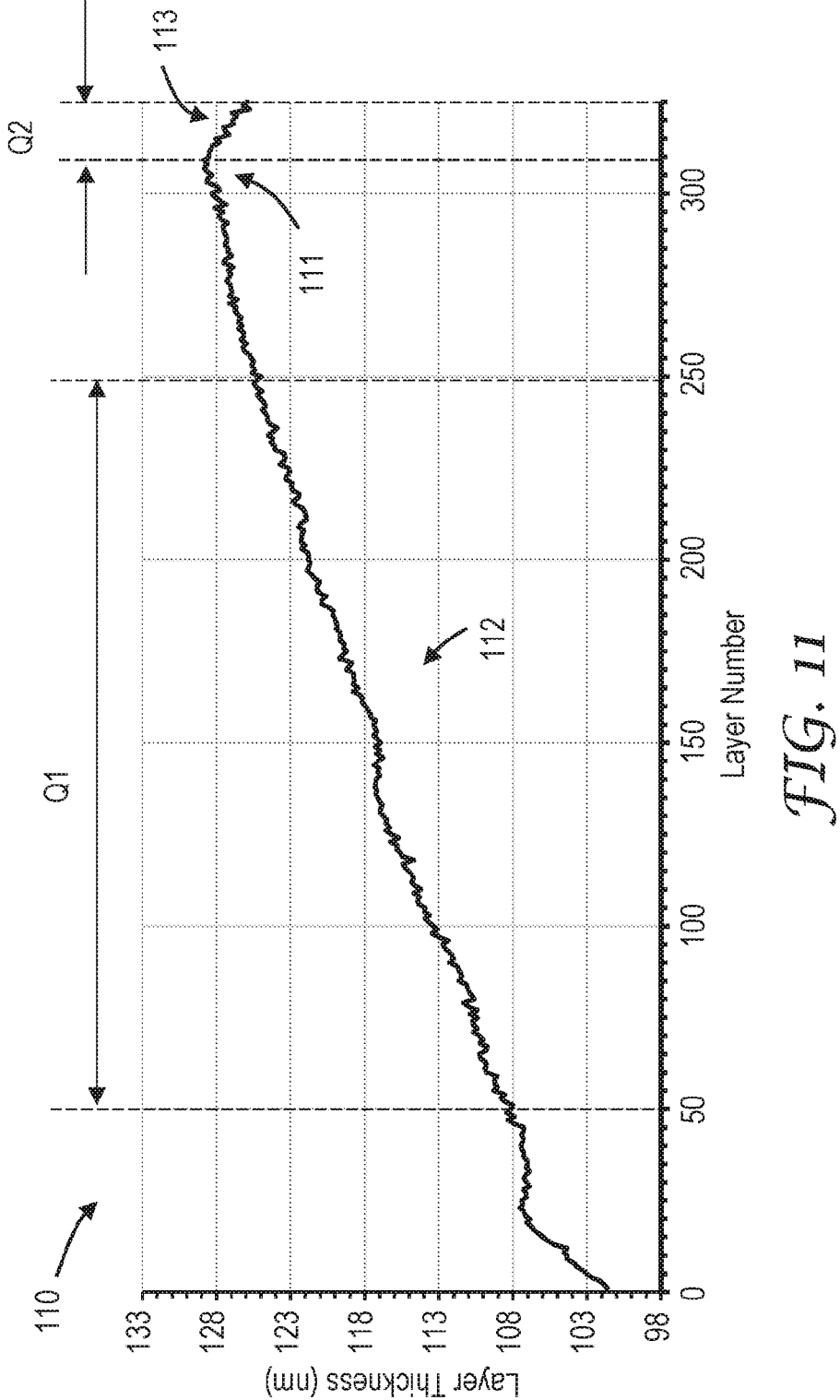
FIG. 11 is an illustrative plot of average layer thickness versus layer number for a plurality of polymeric layers according to some embodiments.
Figure 12:
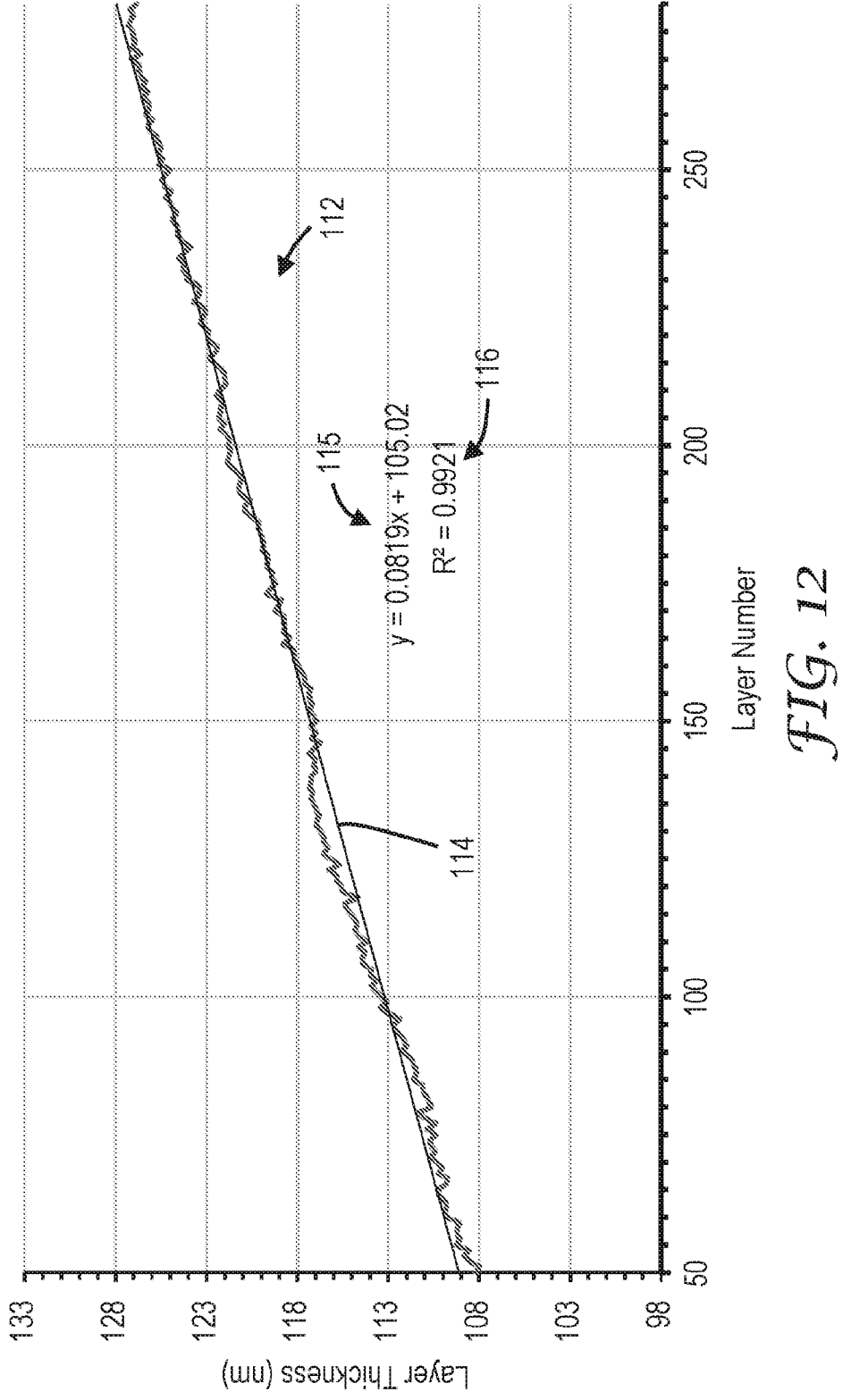
FIGS. 12-14 show portions of the plot of FIG. 11.
Figure 13:
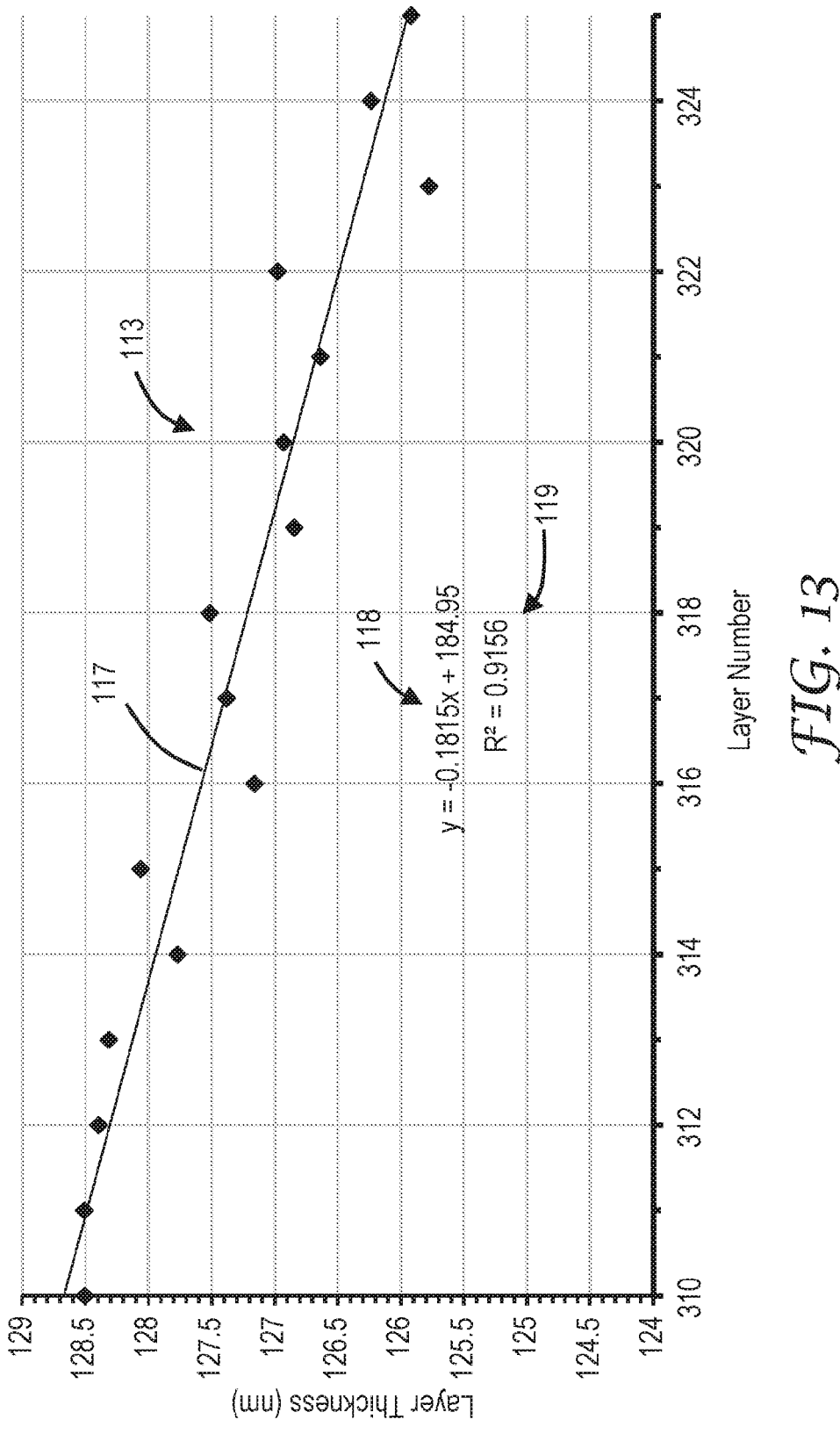
Figure 14:
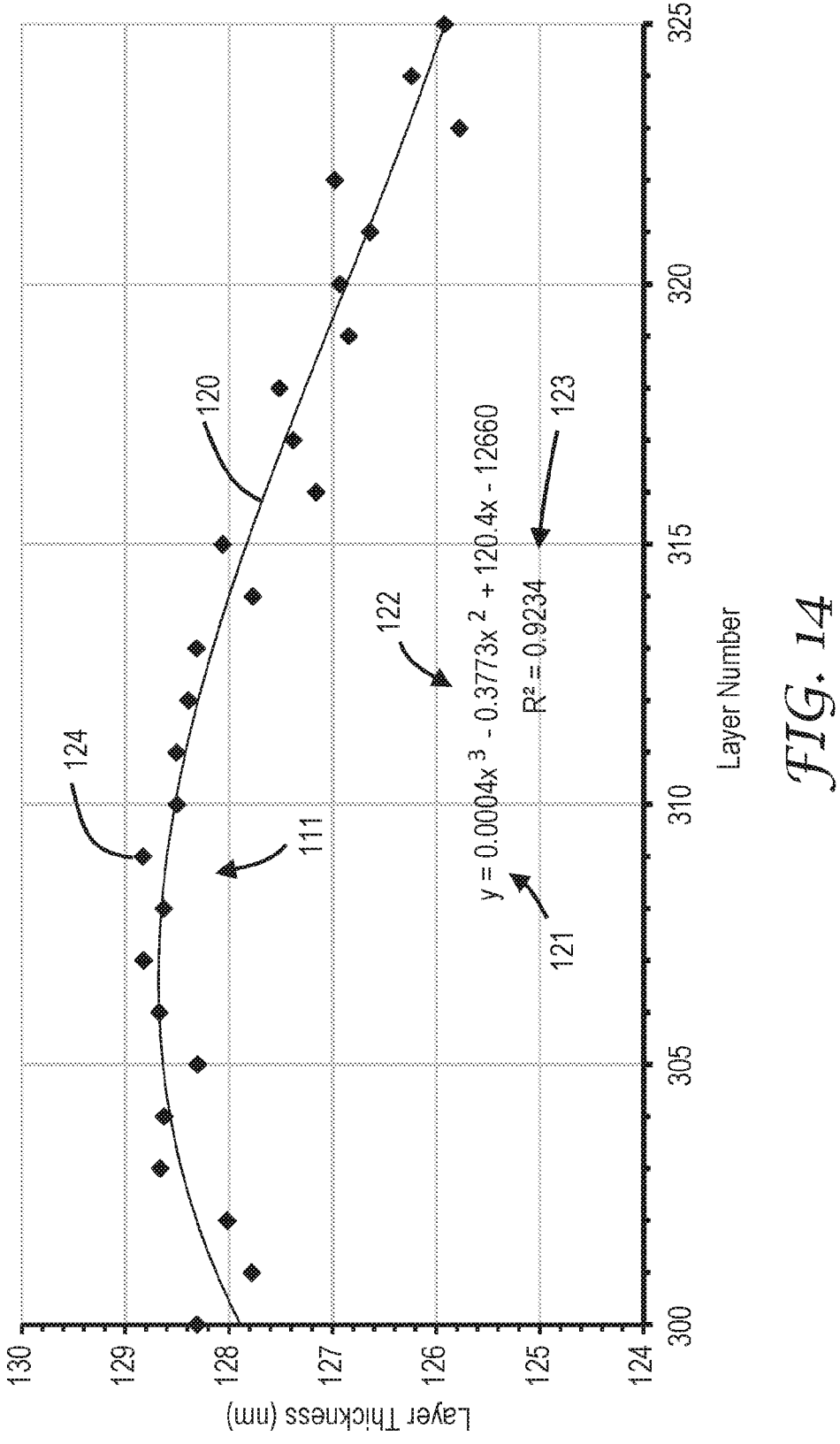

FIG. 11 is a plot 110 of average layer thickness versus layer number for a plurality of polymeric layers 10, 11, according to some embodiments. The thickness profile can be for a plurality of polymeric layers 10, 11 in an entire film or in a packet (e.g., 141 or 142) of a film. FIGS. 12-14 show portions of the plot of FIG. 11.

In some embodiments, a plot 110 of an average layer thickness t versus a layer number of the plurality of polymeric layers 11, 12 includes a knee region 111 separating a left region 112 including at least Q1 sequentially arranged polymeric layers where the polymeric layers have lower layer numbers, from a right region 113 including at least Q2 sequentially arranged polymeric layers where the polymeric layers have higher layer numbers, such that a linear fit 114 (see, e.g., FIG. 12) to the at least Q1 sequentially arranged polymeric layers in the left region 112 has a positive linear slope 115 having a magnitude of greater than about 0.04 nm per layer number with an r-squared value 116 of greater than about 0.8, and a linear fit 117 (see, e.g., FIG. 13) to the at least Q2 sequentially arranged polymeric layers in the right region 113 has a negative linear slope 118 having a sufficiently large magnitude so that for a substantially normally incident light 50 having a first polarization state, an optical transmittance 130 (see, e.g., FIG. 18) of the optical film versus wavelength has a band edge 131 between about 800 nm and about 1100 nm, where a best linear fit 132 (see, e.g., FIG. 19) to the band edge 131 correlating the optical transmittance to the wavelength at least across a wavelength range where the optical transmittance along the band edge increases from about 10% to at least about 80% has a slope 133 of greater than about 3%/nm, or greater than about 4%/nm, or in any of the ranges described elsewhere herein for a band edge slope. In some embodiments, the best linear fit 132 has an r-squared value 138 of greater than about 0.8, or greater than about 0.85, or greater than about 0.9, or greater than about 0.93, or greater than about 0.95. Q1 is an integer greater than about 100. In some embodiments, Q1 is at least 100, or at least 150, or at least 180. Q2 is an integer greater than about 10. In some embodiments, Q2 is at least 10, or at least 12, or at least 14.

In some embodiments, the linear fit 117 to the at least Q2 sequentially arranged polymeric layers in the right region 113 has a negative linear slope 118 having a magnitude of greater than about 0.1 nm per layer number with an r-squared value 119 of greater than about 0.8. In some embodiments, the negative linear slope 118 of the linear fit 117 has a magnitude of greater than about 0.12 nm per layer number, or greater than about 0.14 nm per layer number, or greater than about 0.16 nm per layer number. In some such embodiments or in other embodiments, the r-squared value 119 of the linear fit 117 is greater than about 0.8, or greater than about 0.85, or greater than about 0.9.

In some embodiments, the positive linear slope 115 of the linear fit 114 has a magnitude of greater than about 0.05 nm per layer number, or greater than about 0.06 per layer number, or greater than about 0.07 per layer number. In some such embodiments or in other embodiments, the r-squared value 116 of the linear fit 114 is greater than about 0.8, or greater than about 0.85, or greater than about 0.9, or greater than about 0.95.

In some embodiments, a plot 110 of an average layer thickness t versus a layer number of the plurality of polymeric layers includes a knee region 111 separating a left region 112 including at least 100 sequentially arranged polymeric layers where the polymeric layers have lower layer numbers, from a right region 113 including at least 10 sequentially arranged polymeric layers where the polymeric layers have higher layer numbers, such that a third order polynomial fit 120 (see, e.g., FIG. 14) to at least 15 sequentially arranged polymeric layers including the knee region 111 has a positive third order coefficient 121 and a negative second order coefficient 122 with an r-squared value 123 of greater than about 0.8. In some embodiments, the r-squared value 123 is greater than about 0.85, or greater than about 0.9. In some embodiments, the left region 112 includes at least 150 or at least 180 sequentially arranged polymeric layers. In some embodiments, the right region 113 includes at least 12 or at least 14 sequentially arranged polymeric layers.

In some embodiments, an optical film 100, 100' includes a plurality of polymeric layers 10, 11 sequentially numbered from 1 to N, where N is an integer greater than about 100 or at least 150 and each of the polymeric layers 10, 11 has an average thickness less than about 300 nm. The optical film 100, 100' may include other layers (e.g., 146, 147, 143*a*, 143*b*) in addition to the polymeric layers 10, 11 that are thicker than about 500 nm, for example. In some embodiments, a plot 110 of an average layer thickness t versus a layer number of the plurality of polymeric layers 10,11 includes a knee region 111 including a thickest polymeric layer 124 in the plurality of polymeric layers 10, 11, such that the optical film 100, 100' or the plurality of polymeric layers 10, 11 has reflectance and transmittance properties described elsewhere herein.

In some embodiments, the layer thickness profile in region 32, 82, or 113 is decreasing with increasing layer number as described by an exponential function as described further elsewhere herein.

Figure 15:
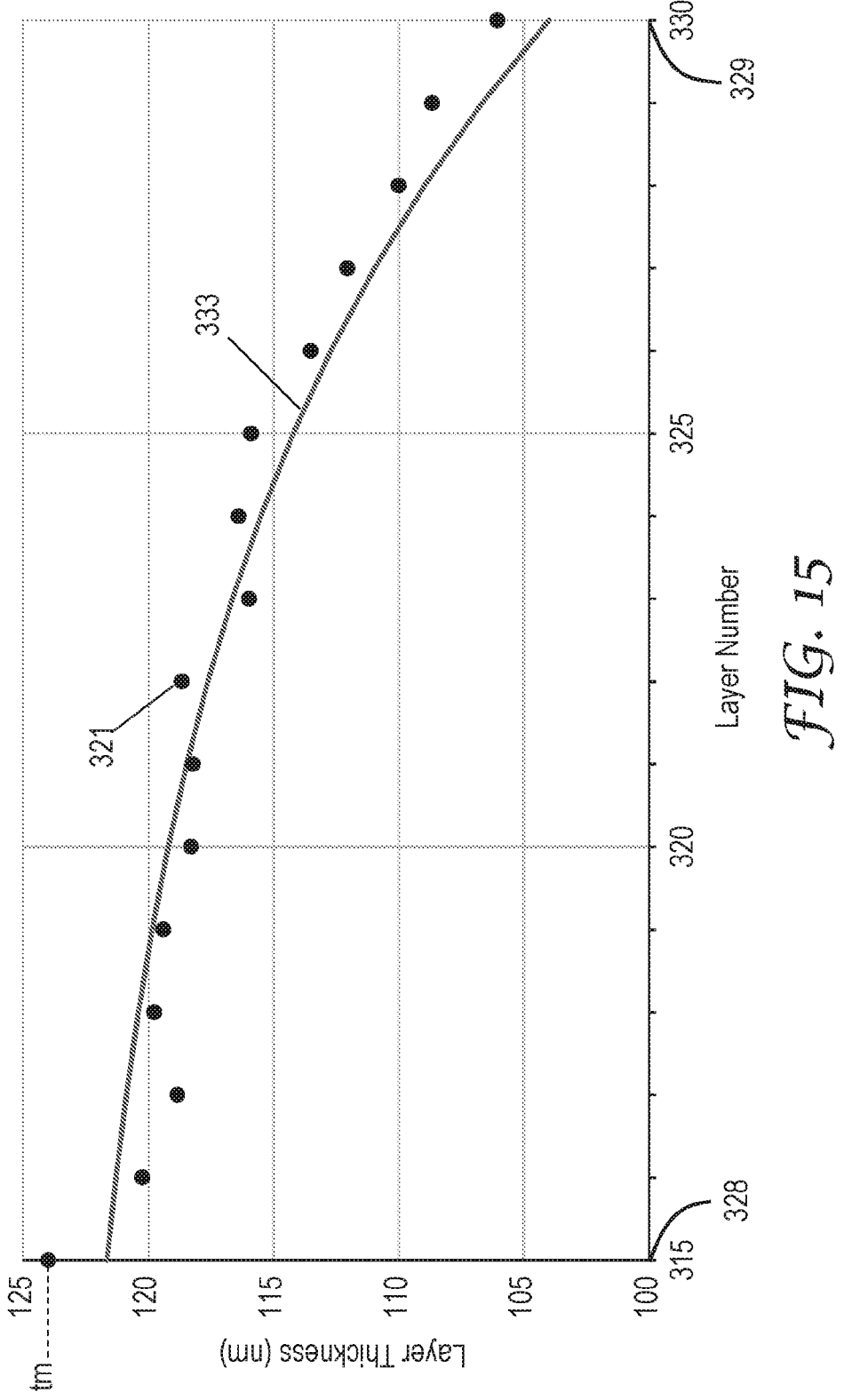
FIG. 15 is a schematic illustrative plot of average layer thickness versus layer number for a portion of a plurality of polymeric layers.

FIG. 15 is a schematic plot of average layer thickness 321 versus layer number for an mth layer 328 to an Nth layer 329, according to some embodiments. In some embodiments, an mth layer 328 in the plurality of the polymeric layers 10, 11 has an average thickness tm, m≤N, such that an average thickness of each polymeric layer in the plurality of polymeric layers 10, 11 having a layer number n, m≤n≤N, is within about 10% of $$tm - A\ e^{\frac{-(N-n)}{d}}\text{ (curve 333),}$$

where A is a real number and d is an integer. In some embodiments, 0.01 tm≤A≤0.25 tm or 0.01 tm≤A≤0.2 tm. In some embodiments, 0.005N≤d≤0.1N or 0.01N≤d≤0.1N. In some embodiments, N−m≥5, or N−m≥8, or N−m≥10. In some embodiments, the average thickness of the polymeric layer 329 having the layer number N is at least about 10%, or at least about 12%, or at least about 14% less than tm. In some embodiments, the average thickness of each polymeric layer in the plurality of polymeric layers 10, 11 having a layer number n, m≤n≤N, is within about 5%, or within about 4%, or within about 3% of $$tm - A\,e^{\frac{-(N-n)}{d}}.$$

In some embodiments, the average thickness of each polymeric layer in the plurality of polymeric layers 10, 11 having a layer number n, m≤n≤N, is within about 5%, or within about 4%, or within about 3%, or within about 2% of $$tm - A\ e^{\frac{-(N-n)}{d}}.$$

For the illustrated curve 333, d=7, A=20 nm, N=330, m=315, and tm=124 nm. The parameter A specifies the amplitude of the apodization (shift in layer thickness profile near a side of a packet or film) and the parameter d determines the number of layers having a significant shift in thickness.

Figure 16:
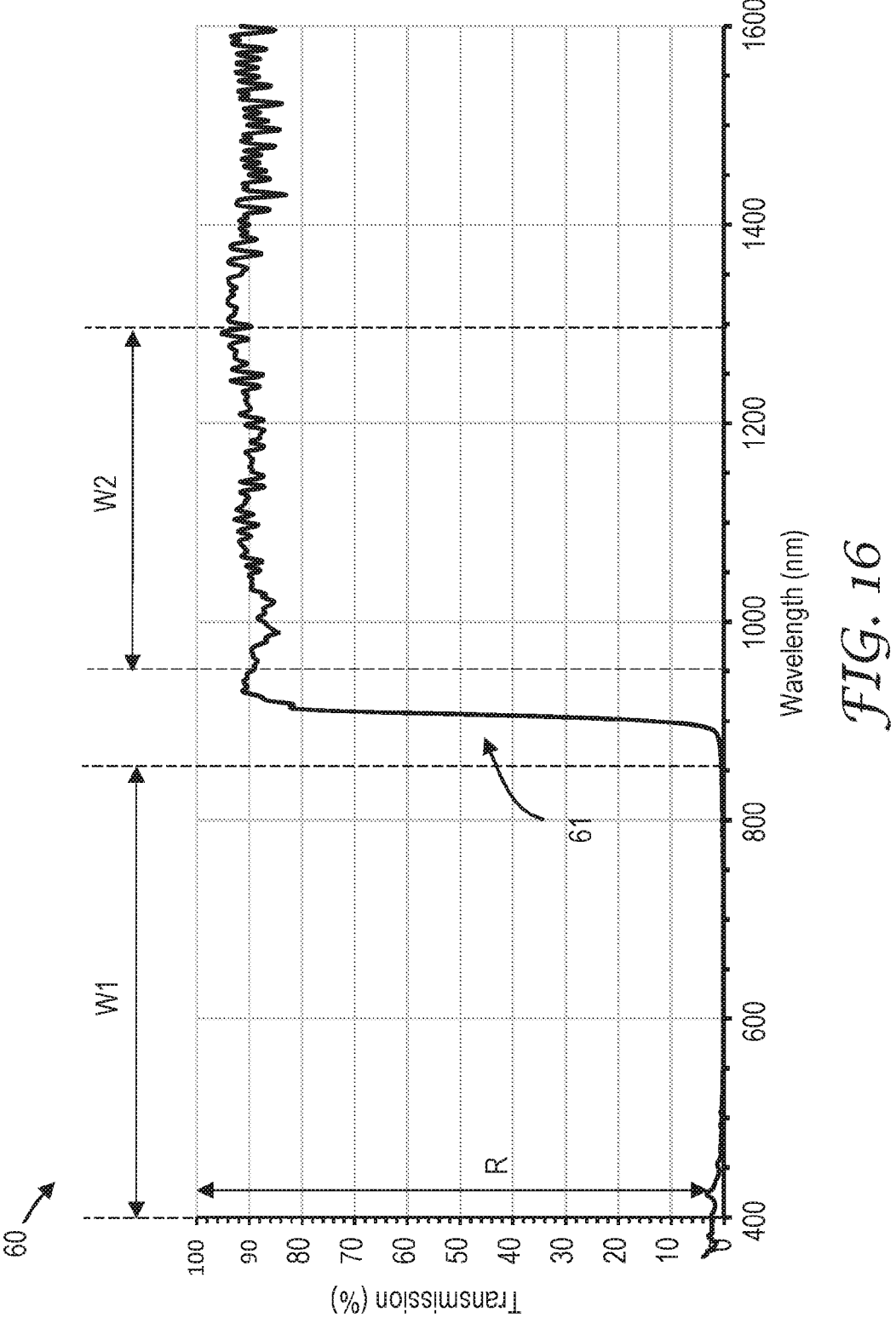
FIG. 16 is an illustrative plot of the optical transmittance of an optical film versus wavelength.
Figure 17:
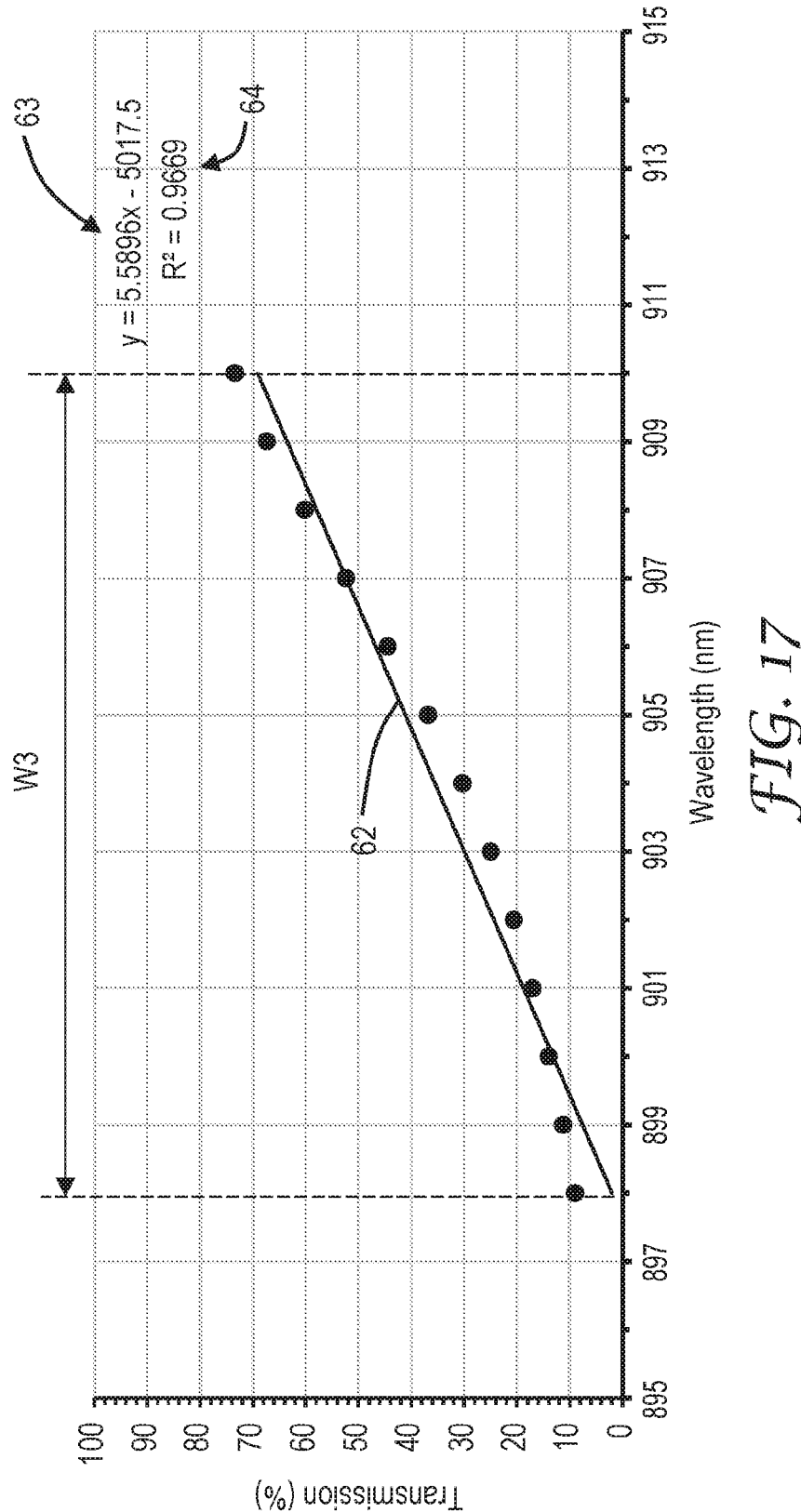
FIG. 17 is a portion of the plot of FIG. 16.

FIG. 16 is a plot of the optical transmittance 60 of an optical film 100, 100' versus wavelength according to some embodiments. FIG. 17 is a portion of the plot of FIG. 16 near a band edge 61. The optical transmittance 60 can be for substantially normally incident light 50 having a first polarization state 171. In some embodiments, the optical film is a reflective polarizer substantially transmitting light having a second polarization state 172 orthogonal to the first polarization state 171. In other embodiments, the optical film is a mirror film having an optical transmittance similar to optical transmittance 60 for substantially normally incident light 50 having the second polarization state 171. The layer thickness profile of FIG. 3 for a packet reflecting longer wavelengths in an optical film also including a packet reflecting shorter wavelengths can produce the optical transmittance 60. The layer thickness profile of FIG. 8 can produce a similar optical transmittance. In some embodiments, the optical film 100, 100' or of the plurality of polymeric layers 10, 11 is substantially non-absorbing so that an optical reflectance R of the optical film is substantially equal to 100% minus the optical transmittance of the optical film.

In some embodiments, for substantially normally incident light 50 and a first wavelength range W1 extending from about 400 nm to about 800 nm and a second wavelength range W2 extending from about 950 nm to about 1300 nm, the plurality of polymeric layers 10, 11 or the optical film 100, 100': reflects greater than about 80% of the incident light having a first polarization state 171 in the first wavelength range W1; transmits greater than about 40% of the incident light having a second polarization state 172, orthogonal to the first polarization state 171, in the first wavelength range W1; and, in some embodiments, transmits greater than about 60% of the incident light in the second wavelength range W2 for each of the first and second polarization states 171 and 172. In some embodiments, the plurality of polymeric layers 10, 11 or the optical film 100, 100' transmits greater than about 50% of the incident light having the second polarization state 172 in the first wavelength range W1. In some embodiments, the plurality of polymeric layers 10, 11 or the optical film 100, 100' transmits greater than about 70%, or greater than about 80% of the incident light in the second wavelength range W2 for each of the first and second polarization states 171 and 172. In some embodiments, for substantially normally incident light 50, the optical film 100, 100' or the plurality of polymeric layers 10, 11 reflects greater than about 80% of the incident light 50 in the first wavelength range W1 for the first polarization state 171 and for an orthogonal second polarization state 172. In some such embodiments or in other embodiments, the plurality of polymeric layers 10, 11 or the optical film 100, 100': transmits greater than about 60%, or greater than about 70%, or greater than about 80% of the incident light in the second wavelength range W2 for each of the first and second polarization states 171 and 172.

In some embodiments, for a substantially normally incident light 50 having a first polarization state 171, an optical transmittance 60 of the optical film versus wavelength includes a band edge 61 between about 850 nm and about 950 nm, such that a best linear fit 62 (see, e.g., FIG. 17) to the band edge correlating the optical transmittance to the wavelength at least across a wavelength range W3 where the optical transmittance increases from about 10% to at least about 70% (e.g., from about 10% to about 70%, or from about 10% to about 80%, or from about 10% to at least about 80%) has a slope 63 of greater than about 3%/nm. In some embodiments, the slope 63 is greater than about 3.5%/nm, or greater than about 4%/nm, or greater than about 4.5%/nm, or greater than about 5%/nm. In some embodiments, the best linear fit 62 has an r-squared value 64 of greater than about 0.8, or greater than about 0.85, or greater than about 0.9, or greater than about 0.93, or greater than about 0.95.

Figure 18:
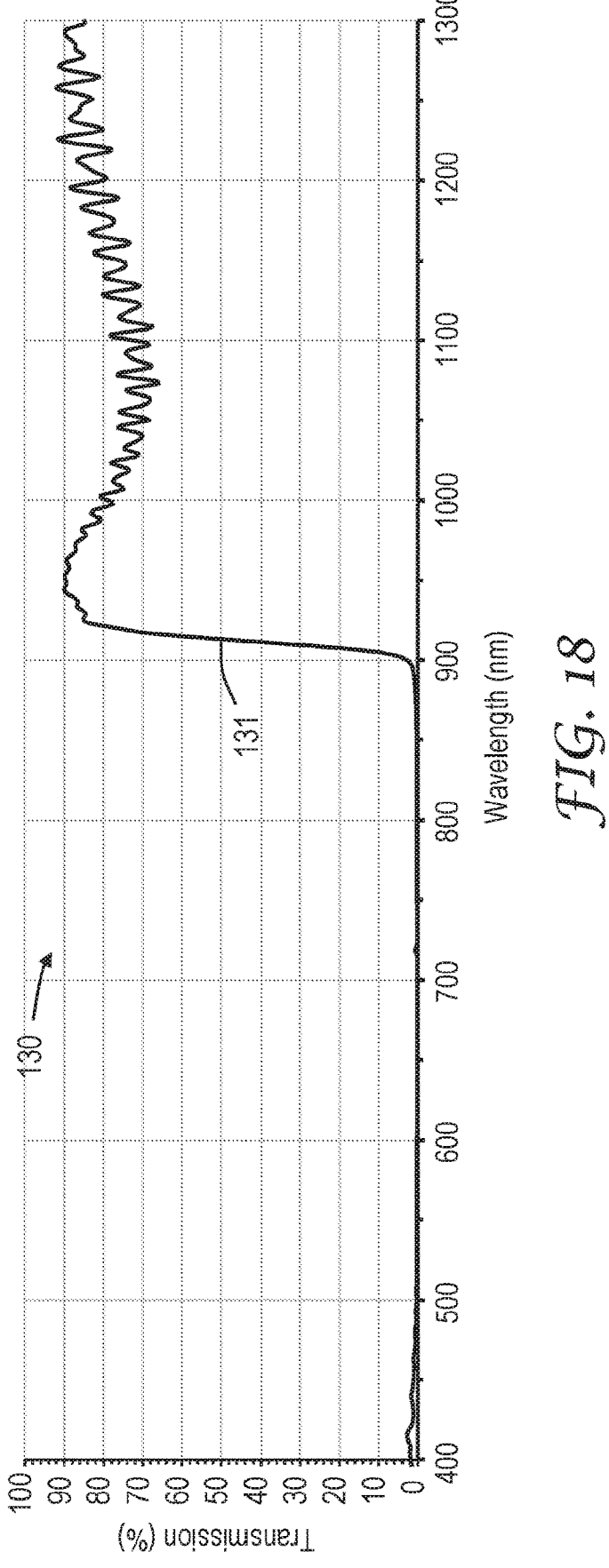
FIG. 18 is a plot of the optical transmittance of an optical film versus wavelength according to some embodiments.
Figure 19:
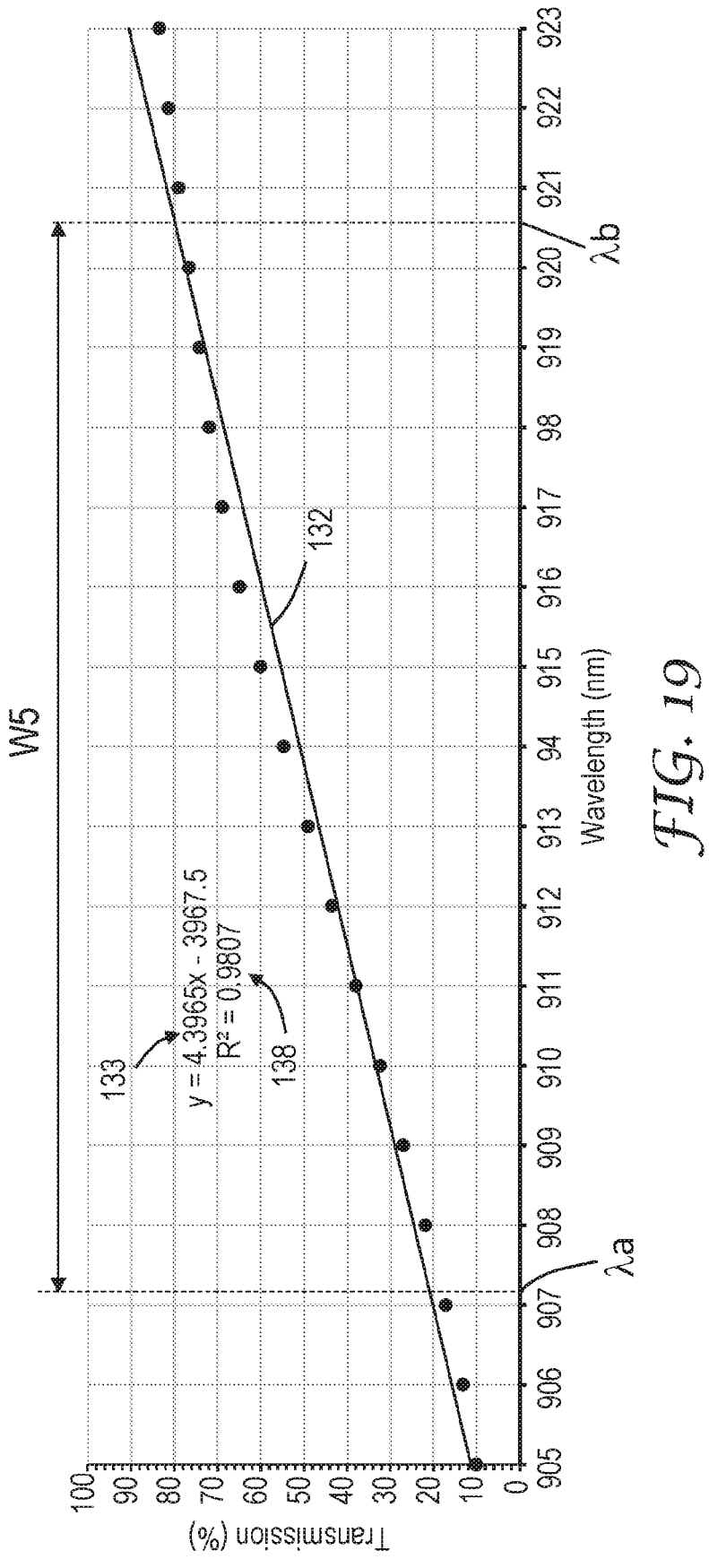
FIGS. 19-21 are portions of the plot of FIG. 18.
Figure 20:
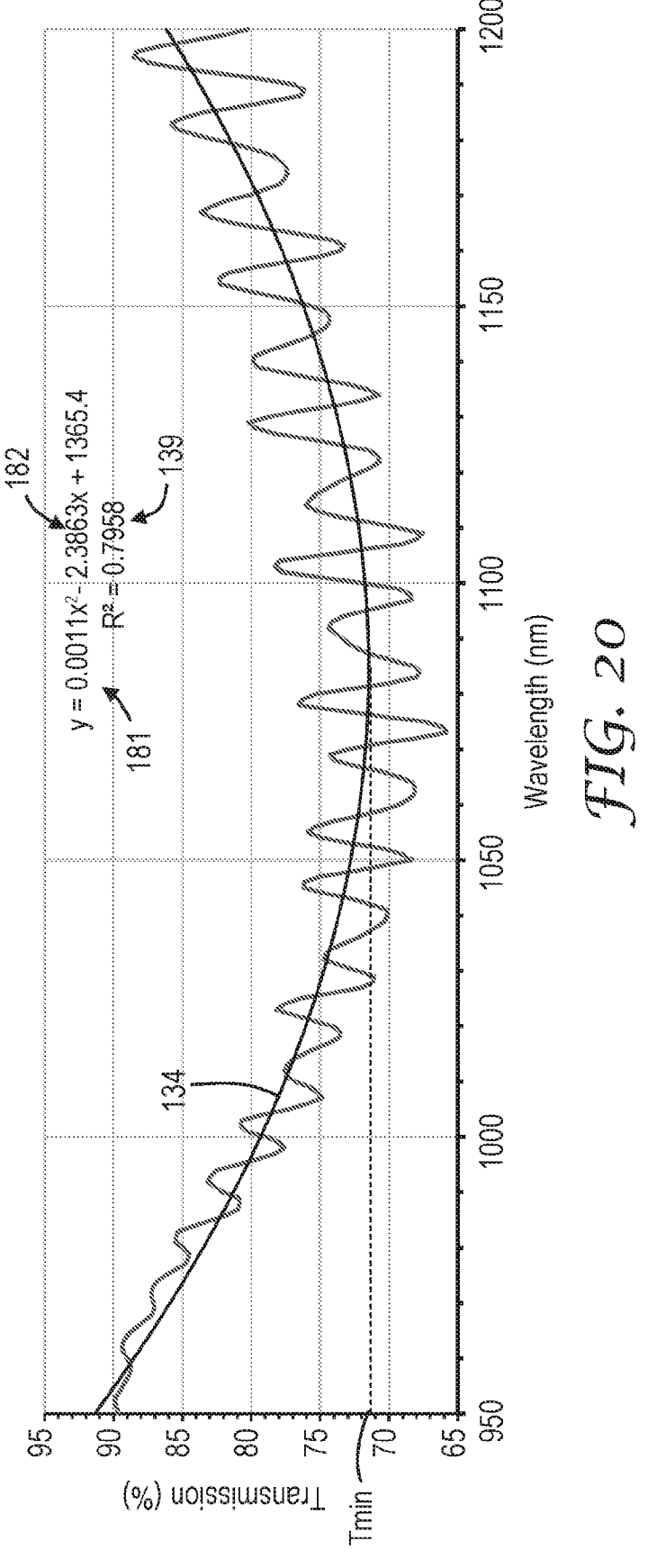
Figure 21:
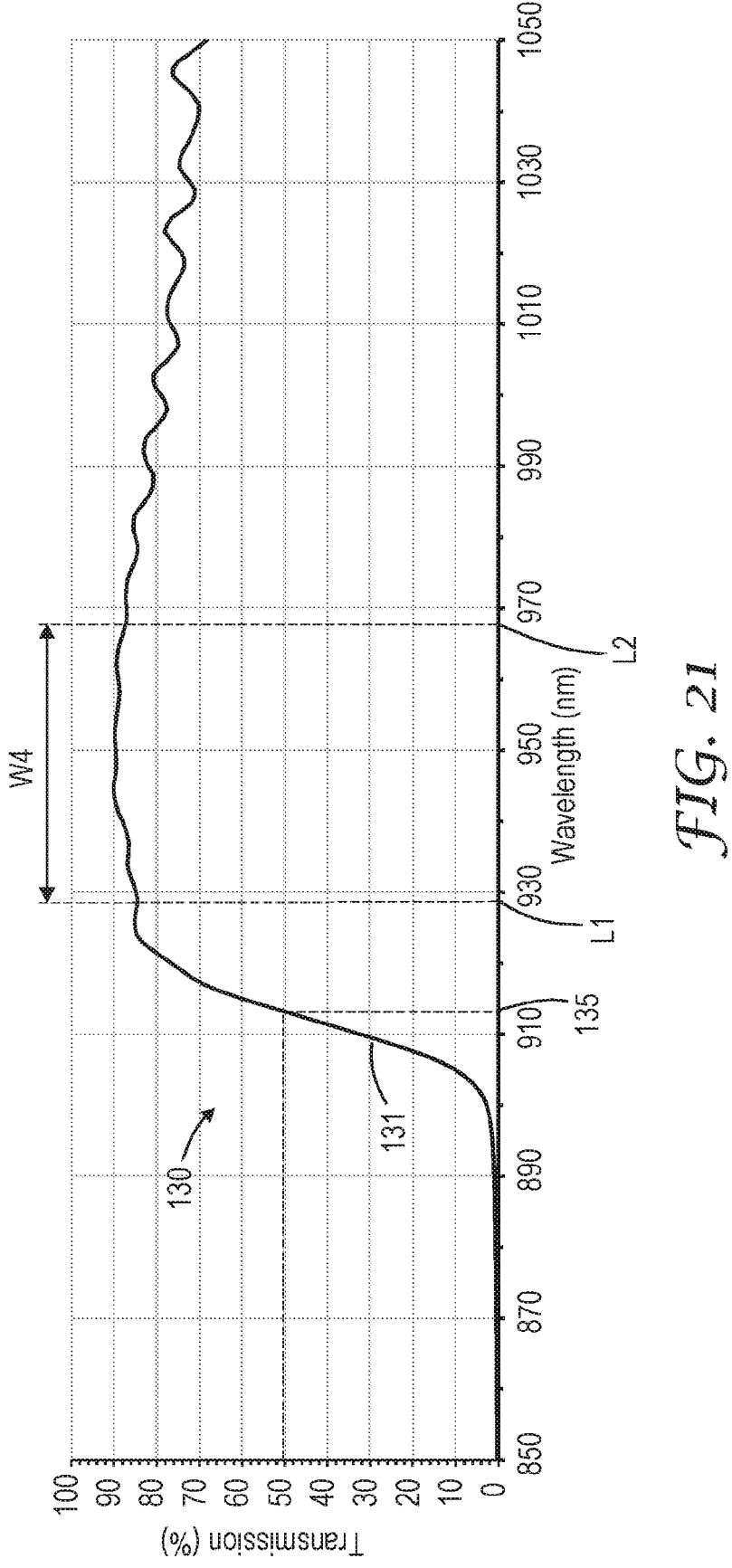

FIG. 18 is a plot of the optical transmittance 130 of an optical film 100, 100' versus wavelength. FIGS. 19-21 are portions of the plot of FIG. 18. The optical transmittance 130 can be for substantially normally incident light 50 having a first polarization state 171. In some embodiments, the optical film is a reflective polarizer substantially transmitting light having a second polarization state 172 orthogonal to the first polarization state 171. In other embodiments, the optical film is a mirror film having an optical transmittance similar to optical transmittance 130 for substantially normally incident light 50 having the second polarization state 171. The layer thickness profile of FIG. 11 for a packet reflecting longer wavelengths in an optical film also including a packet reflecting shorter wavelengths can produce the optical transmittance 130.

In some embodiments, the plurality of polymeric layers 10, 11 or the optical film 100, 100': reflects greater than about 80% of the incident light 50 having a first polarization state 171 in the first wavelength range W1; transmits greater than about 40%, or greater than about 50%, of the incident light having a second polarization state 172, orthogonal to the first polarization state, in the first wavelength range W1; transmits greater than about 60% of the incident light in the second wavelength range W2 for each of the first and second polarization states 171 and 172; and an optical transmittance 130 of the optical film versus wavelength for the first polarization state 171 includes a band edge 131 between about 800 nm and about 1100 nm. In some embodiments, the band edge 131 is between about 850 nm and about 950 nm. In some embodiments, a best linear fit 132 (see, e.g., FIG. 19) to the band edge 131 correlating the optical transmittance to the wavelength at least across a wavelength range where the optical transmittance along the band edge increases from about 10% to at least about 70% has a slope 133 of greater than about 3%/nm or in any of the ranges described elsewhere for a band edge slope (e.g., greater than about 4%/nm).

In some embodiments, a wavelength range W5 (see, e.g., FIG. 19) from a first wavelength λa where the best linear fit 132 is 20% to a second wavelength λb where the best linear fit 132 is 80% is less than about 30 nm wide, or less than about 20 nm wide, or less than about 15 nm wide. In some embodiments, a wavelength range from a smallest wavelength greater than about 600 nm where the transmittance is at least about 20% to a smallest wavelength greater than about 600 nm where the transmittance is at least about 80% is less than about 30 nm wide, or less than about 20 nm wide, or less than about 15 nm wide.

In some embodiments, a second order polynomial fit 134 (see, e.g., FIG. 20) to the optical transmittance 130 across a wavelength range at least 200 nm wide between the band edge and about 2000 nm or about 1600 nm or about 1300 nm has an r-squared value 139 of greater than about 0.6 and a minimum optical transmittance Tmin of less than about 80%. The wavelength range between the band edge and about 2000 nm or about 1600 nm or about 1300 nm can be the range from about 950 nm to about 1200 nm, for example. In some embodiments, the r-squared value 139 is greater than about 0.7 or greater than about 0.75. In some embodiments, the second order polynomial fit 134 has a positive second order coefficient 181 and a negative first order coefficient 182. In some embodiments, the second order polynomial fit 134 has a minimum optical transmittance Tmin of less than about 75%. In some embodiments, the minimum optical transmittance Tmin is greater than about 60% or greater than about 65%.

In some embodiments, for the substantially normally incident light and a third wavelength range W4 extending from a smaller wavelength L1 to a greater wavelength L2 (see, e.g., FIG. 21), where 30 nm≤L2−L1≤50 nm and L1 is greater than and within about 20 nm of a wavelength 135 corresponding to an optical transmittance of about 50% along the band edge, the optical transmittance 130 has an average of greater than about 75%, or greater than about 80%, or greater than about 85%. In some embodiments, 35 nm≤L2−L1≤45 nm. In some embodiments, L1 is within about 18 nm or within about 16 nm of the wavelength 135.

Figure 22:
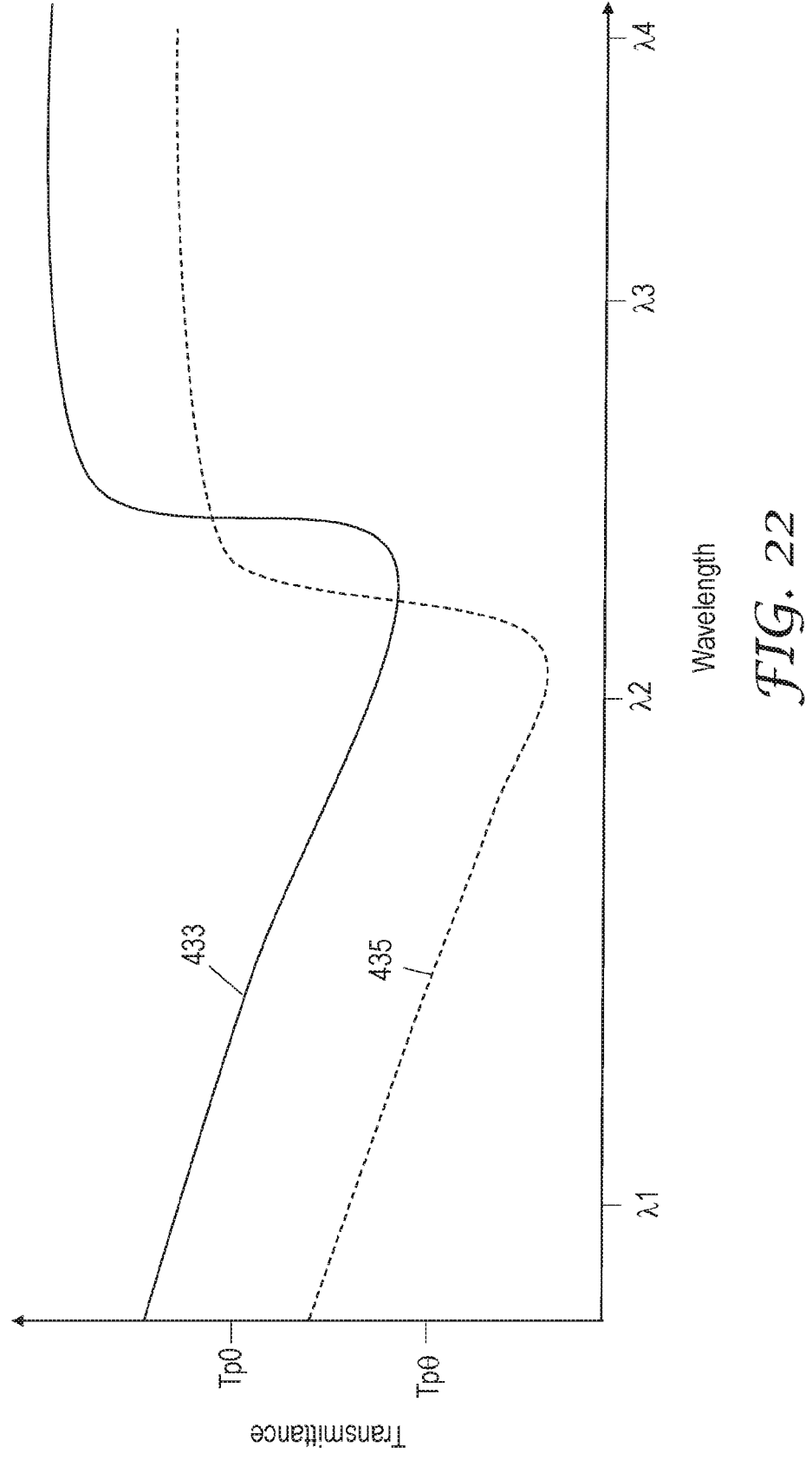
FIG. 22 is a schematic plot of optical transmittance as a function of wavelength for an illustrative reflective polarizer.

FIG. 22 is a schematic plot of optical transmittance as a function of wavelength for a reflective polarizer for light having a pass polarization state (e.g., the second polarization state 172), according to some embodiments. The pass polarization state can be a p-polarization state (p-pol) or an s-polarization state (s-pol) with the projection of the electric field onto a plane of the reflective polarizer being parallel to a pass axis (e.g., x-axis) of the reflective polarizer. The optical transmittance 433 for substantially normally incident light 50 and the optical transmittance 435 for light 170 at an incident angle θ are shown. The average transmittances Tp0 and Tpθ over a wavelength range of λ1 to λ2 are indicated. λ1 may be about 400 nm and λ2 may be about 600 nm, about 700 nm, or about 800 nm, for example. The wavelength range of λ1 to λ2 may correspond to the first wavelength range W1. In some embodiments λ3 may be about 950 nm and λ4 may be about 2000 nm, or about 1600 nm, or about 1100 nm, or about 1300 nm, or about 1200 nm, for example. The wavelength range of λ3 to λ4 may correspond to the second wavelength range W2, for example. In some embodiments, the transmittance rapidly increases for wavelengths larger than λ2 so that the transmittance is larger in the second wavelength range W2 than in the first wavelength range W1. In some embodiments, for the second polarization state and for the first wavelength range W1, the reflective polarizer has an average optical transmittance Tp0 greater than about 40%, or greater than about 45%, or greater than about 50%, or greater than about 55%, or greater than about 60%. In some embodiments, for the second polarization state 172 and the first wavelength range W1, the reflective polarizer has a greater average optical transmittance (e.g., Tp0) for light incident at a smaller incident angle (e.g., zero degrees to about 20 degrees, or approximately zero degrees) and a smaller average optical transmittance (e.g., Tp0) for light incident at a greater incident angle (e.g., about 30 degrees to about 50 degrees, or about 45 degrees). In some embodiments, the second polarization state 172 is a p-polarization state and the greater incident angle is less than about 50 degrees. In some embodiments, the reflective polarizer has a greater average optical transmittance (e.g., Tp0) for light incident at a smaller incident angle and a smaller average optical transmittance (e.g., Tp0) for light incident at a greater incident angle for light in a pass polarization state for each of a p-pol and an s-pol light. In some embodiments, the reflective polarizer has a greater average optical transmittance (e.g., Tp0) for substantially normally incident light and a smaller average optical transmittance (e.g., Tp0) for light incident at an angle of incidence of about 45 degrees for a second (pass) polarization state for any plane of incidence. In some embodiments, a difference (e.g., Tpθ−Tp0) between the greater average optical transmittance and the smaller average optical transmittance is at least about 10%, or at least about 20%, or at least about 30%.

The linear fits described herein can be linear least squares fits as is known in the art. Polynomial fits can similarly be least squares fits. Such fits minimize the sum of squares of residuals where a residual is the difference between data and the fitted curve (line or polynomial). The least squares analysis allows the r-squared value, sometimes referred to as the coefficient of determination, to be determined.

In some embodiments, the optical film includes an optically diffusive layer disposed on the plurality of polymeric layers 11, 12. The optically diffusive layer can be disposed on one of the outermost layers 146 or 147, for example. The optically diffusive layer can be any suitable optically diffusive layer. Suitable optically diffusive layers include those described in U.S. provisional co-pending application 63/021,751 titled OPTICAL FILMS AND STACKS INCLUDING OPTICALLY DIFFUSIVE LAYER and filed on May 8, 2020, and hereby incorporated herein by reference to the extent that it does not contradict the present description. Other suitable optically diffusive layers include those described in U.S. provisional co-pending application 62/704,399 titled OPTICAL CONSTRUCTION AND DISPLAY SYSTEM INCLUDING SAME and filed on May 8, 2020, and hereby incorporated herein by reference to the extent that it does not contradict the present description.

In some embodiments, the optical film includes an optical layer disposed on the plurality of polymeric layers 11, 12 having a structured major surface facing away from the polymeric layers 11, 12. The optical layer can be disposed on one of the outermost layers 146 or 147, for example, or one of the outermost layers 146 or 147 can be the optical layer. The structured surface can reduce friction with an adjacent layer or film and/or reduce wet-out with an adjacent layer or film. For example, the optical layer can include an array of discrete spaced-apart optical bumps as described in U.S. provisional co-pending application 63/021,773 titled OPTICAL FILM WITH DISCONTINUOUS COATING and filed on May 8, 2020, and hereby incorporated herein by reference to the extent that it does not contradict the present description. As another example, the optical layer can include a plurality of spaced apart elongated structures elongated along a same first direction as described in U.S. provisional co-pending application 63/021,756 titled OPTICALLY DIFFUSIVE FILM WITH ELONGATED STRUCTURES and filed on May 8, 2020, and hereby incorporated herein by reference to the extent that it does not contradict the present description.

In some embodiments, each of the outermost layers of the optical film includes particles partially protruding therefrom to form a major surface facing away from the plurality of polymeric layers as described in U.S. provisional co-pending application 63/021,765 titled REFLECTIVE POLARIZER WITH IMPROVED OPTICAL CHARACTERISTICS and filed on May 8, 2020, and hereby incorporated herein by reference to the extent that it does not contradict the present description.

Figure 29:
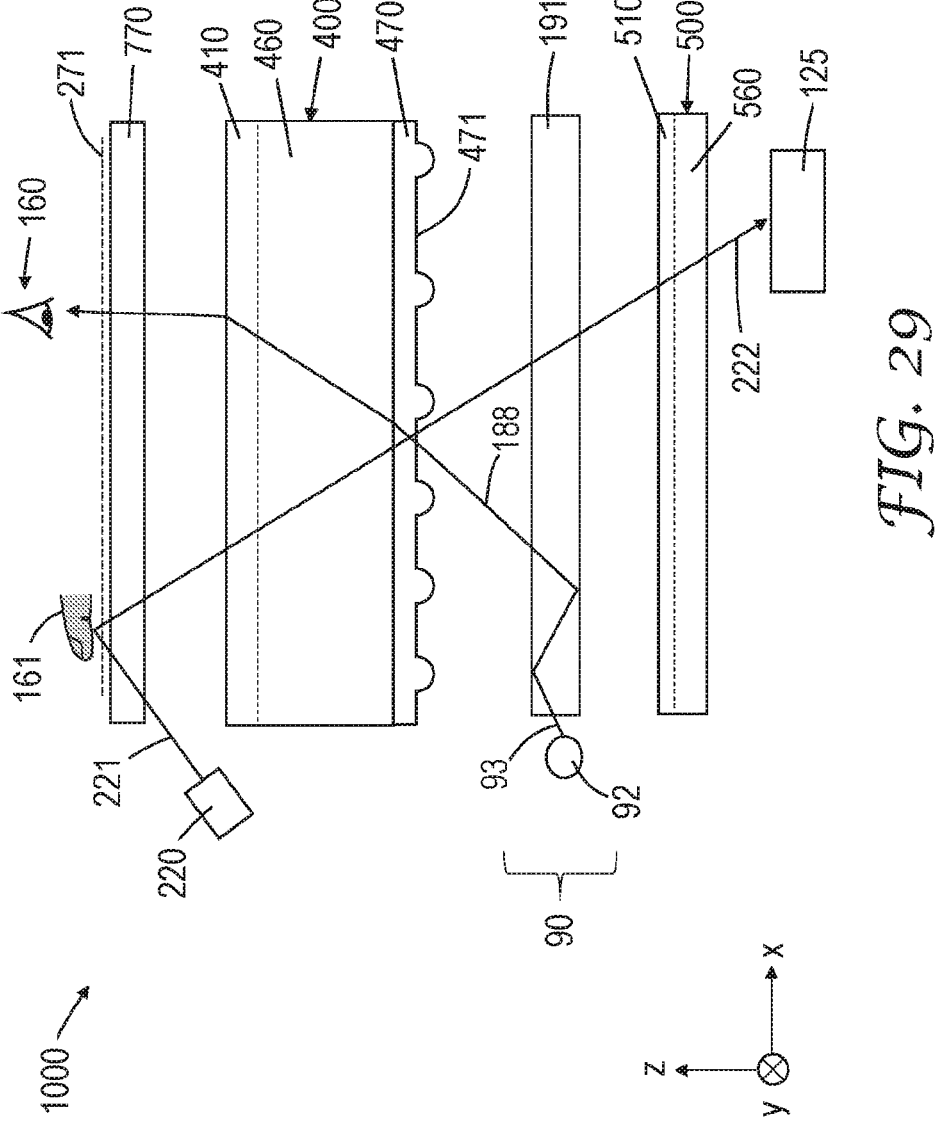
FIG. 29 is a schematic cross-sectional view of a display system.

FIG. 29 is a schematic cross-sectional view of a display system 1000 for sensing a finger 161 of a user 1160 applied to the display system 1000. The display system 1000 includes a display panel 770 configured to generate an image 271 for viewing by the user 160; a lightguide 90 for providing illumination 188 to the display panel 770; an optical film 400; a sensor 125 for sensing the finger 161 of the user 160 disposed proximate the lightguide 90 opposite the optical film 400; an optical film 500 disposed between the lightguide 90 and the sensor 125; and an infrared light source 220 configured to emit an infrared light 221 toward the finger 161 of the user 160 where the sensor 125 is configured to receive at least a portion 222 of the infrared light 221 reflected by the finger 161. In some embodiments, the infrared light source 220 is disposed below a cover glass of the display system 1000. In some embodiments, the infrared light source 220 is disposed below the optical film

500 (e.g., the infrared light source 220 can be disposed such that the optical film 500 is between the lightguide 90 and the infrared light source 220). The display system 1000 can optionally include an optical diffuser disposed between the optical film 400 and the lightguide 90. The optical film 400 and/or the optical film 500 can be any of the optical films described herein. In some embodiments, a display system 1000 for sensing a finger 161 of a user 160 applied to the display system 1000 is provided. The display system 1000 includes a display panel 770 configured to generate an image 271 for viewing by the user 160; a sensor 125 for sensing the finger 161 of the user 160; and an optical film (e.g., optical film 400 and/or optical film 500) described herein disposed between the display panel 770 and the sensor 125. In some embodiments, the display system 1000 includes a first optical film (e.g., optical film 400) and a second optical film (e.g., optical film 500) described herein disposed between the display panel 770 and the sensor 125.

In some embodiments, the optical film 400 includes a plurality of polymeric layers 460 (individual layers are not shown in the schematic illustration of FIG. 29; the plurality of polymeric layers 460 may corresponding to the plurality of polymeric layers 11, 12 depicted in FIG. 1 or 2, for example). In some embodiments, the optical film 400 includes an optically diffusive layer 410 disposed on the plurality of polymeric layers 460. In some embodiments, the optical film 400 includes an optical layer 470 disposed on the plurality of polymeric layers 460 and having a structured major surface 471 facing away from the plurality of polymeric layers 460. In some embodiments, the optical film 400 is an infrared transmissive reflective polarizer. In some embodiments, the reflective polarizer is a collimating reflective polarizer. Such polarizers can provide a collimating effect by reflecting light having a greater incident angle back towards the optical film 500, which can be a mirror film including an optically diffusive layer, so that the light is recycled. Liquid crystal displays (LCDs) often include brightness enhancing prism films (typically crossed prism films) to increase an on-axis brightness of the display. In some cases, such films can be omitted when a collimating reflective polarizer is included. In some embodiments of the display system 1000, there are no brightness enhancing prism films disposed between the display panel 770 and the optical film 500.

In some embodiments, the optical film 500 includes a plurality of polymeric layers 560 (individual layers are not shown in the schematic illustration of FIG. 29; the plurality of polymeric layers 560 may corresponding to the plurality of polymeric layers 11, 12 depicted in FIG. 1 or 2, for example). In some embodiments, the optical film 500 includes an optically diffusive layer 510 disposed on the plurality of polymeric layers 560. In some embodiments, the optical film 400 is an infrared transmissive optical mirror.

Related display systems are described in U.S. provisional co-pending application 63/021,760 titled DISPLAY SYSTEM WITH FINGER SENSING and filed on May 8, 2020, and hereby incorporated herein by reference to the extent that it does not contradict the present description, and in U.S. provisional co-pending application 63/021,739 titled OPTICAL CONSTRUCTION AND DISPLAY SYSTEM and filed on May 8, 2020, and hereby incorporated herein by reference to the extent that it does not contradict the present description.

EXAMPLES

Materials Used in the Examples

| Abbreviation | Description and Source |
| --- | --- |
| PEN | Polyethylene Naphthalate, obtained from 3M Corporation, Saint Paul, MN |
| PETG | A glycol modified copolyester, obtained under the trade designation PETG GN071 from Eastman Chemicals, Knoxville, TN |
| PC1804 | A polycarbonate material, obtained under the trade designation MAKROLON 1804 from Covestro Corporation, Leverkusen, Germany |
| PC2405 | A polycarbonate material, obtained under the trade designation MAKROLON 2405 from Covestro Corporation, Leverkusen, Germany |
| PCTG | A glycol modified copolyester, obtained under the trade designation VM318 PCTG from Eastman Chemicals, Knoxville, TN |

A numerical modelling study was completed using three different layer thickness profiles composed of 650 micro-layers sandwiched between two thicker skin layers. The 650 microlayers alternated between a birefringent High Index Optical layer (HIO) and an isotropic Low Index Optical layer (LIO). The refractive indices used for this model at 633 nm are shown in the table below. These indices were inferred from a multilayer optical reflective polarizer. That film was produced via a multilayer coextrusion process using PEN as the HIO material and a polymer blend of 15.0 weight percent PETG, 40.8 weight percent PCTG, 17.0 weight percent PC1804, and 27.2 weight percent PC2405 as the LIO material. The films were then stretched continuously in a standard tenter with a draw ratio of 6:1 in the transverse direction and constrained in the machine direction (no orientation or relaxation). The oven temperature used for the orientation was 270 degrees Fahrenheit. The indices were inferred by using a numerical model finding what indices gave the best fit between measured spectra and calculated spectra for a 650 microlayer film. The layer thicknesses were measured using an Atomic Force Microscope (Dimension ICON from Bruker Instruments, Billerica, MA).

| | $n_x$ | $n_y$ | $n_z$ |
| --- | --- | --- | --- |
| HIO | 1.8260 | 1.6355 | 1.4893 |
| LIO | 1.5699 | 1.5699 | 1.5699 |

Figure 23:
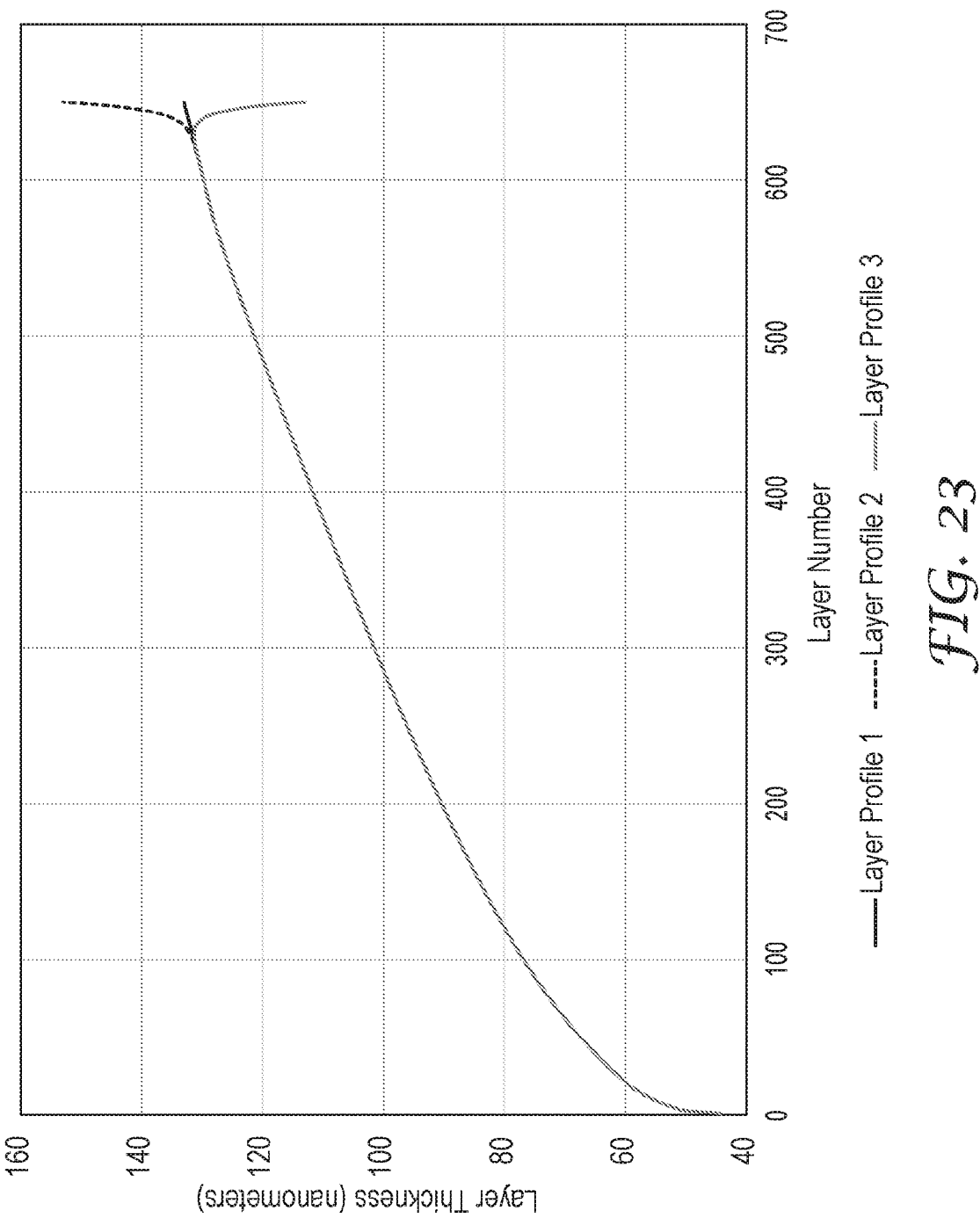
FIG. 23 is a plot of average layer thickness versus layer number for various illustrative optical films.

Three model layer thickness profiles are shown in FIG. 23 and are defined as follows:

Layer Profile 1: A proposed layer profile designed to provided reflectivity from about 400 nanometers to about 930 nanometers for the block polarization state.

Layer Profile 2: compared to Layer Profile 1 it has an apodized "up" configuration $$t = tm - Ae^{\frac{-(N-n)}{d}},$$

utilizing an exponential relationship, where A is an amplitude factor, d describes how many layers the apodized feature penetrates, tm is a layer thickness at the beginning of the apodized feature, N is the total number of layers, and n is the layer number. For Layer Profile 2, A=−20 nm and d=5.

Layer Profile 3: compared to Layer Profile 1 it has an apodized "down" configuration utilizing the same functional form as Layer Profile 2. For Layer Profile 3, A=20 nm and d=5. To simulate the optical performance of these layer profiles with these materials a numerical optical model was employed to calculate the resulting transmission spectra for these reflective polarizers in the block state. The calculations were made for each layer profile with each skin layer composed of the LIO material being 1.5, 2.5, and 5.0 micrometers thick. The table below defines the parameters for Reflective Polarizers 1 through 9 and shows the calculated average transmission over the 930 to 980 nanometer band for each layer profile (average for all skin thicknesses) and the average bandwidth for each layer profile (average for all skin thicknesses). The bandwidths were calculated from the first wavelength the transmission reaches 20% to the wavelength where the transmission finally achieves 80%.

| Reflective Polarizer | Layer Profile | Apodization | Skin Thickness (micrometers) | Bandwidth (nanometers) | Average % Transmission (930 to 980 nanometers) |
|---|---|---|---|---|---|
| 1 | 1 | Standard | 1.5 | 71 | 56.7 |
| 2 | 2 | Up | 1.5 | 117 | 43.6 |
| 3 | 3 | Down | 1.5 | 14 | 82.4 |
| 4 | 1 | Standard | 2.5 | 43 | 70.0 |
| 5 | 2 | Up | 2.5 | 105 | 43.1 |
| 6 | 3 | Down | 2.5 | 18 | 83.2 |
| 7 | 1 | Standard | 5 | 61 | 64.8 |
| 8 | 2 | Up | 5 | 126 | 38.9 |
| 9 | 3 | Down | 5 | 8 | 88.4 |

The reflective polarizers with "Down" apodization are exemplary reflective polarizers (Reflective Polarizers 3, 6, and 9) while those with "Standard" and "Up" apodization are comparative reflective polarizers.

Figure 24:
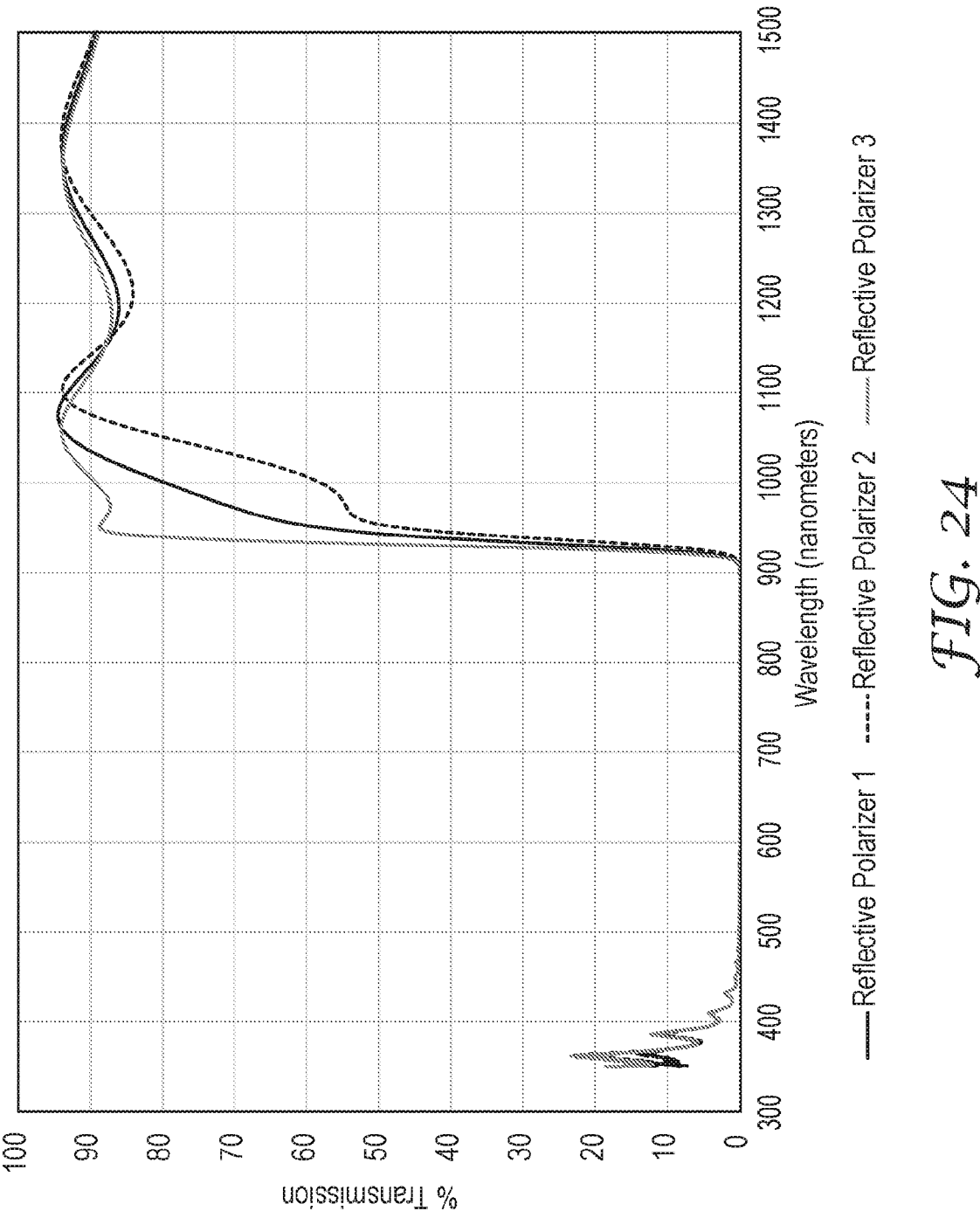
FIGS. 24-26 are block state transmission spectra for substantially normally incident light for various reflective polarizers.
Figure 25:
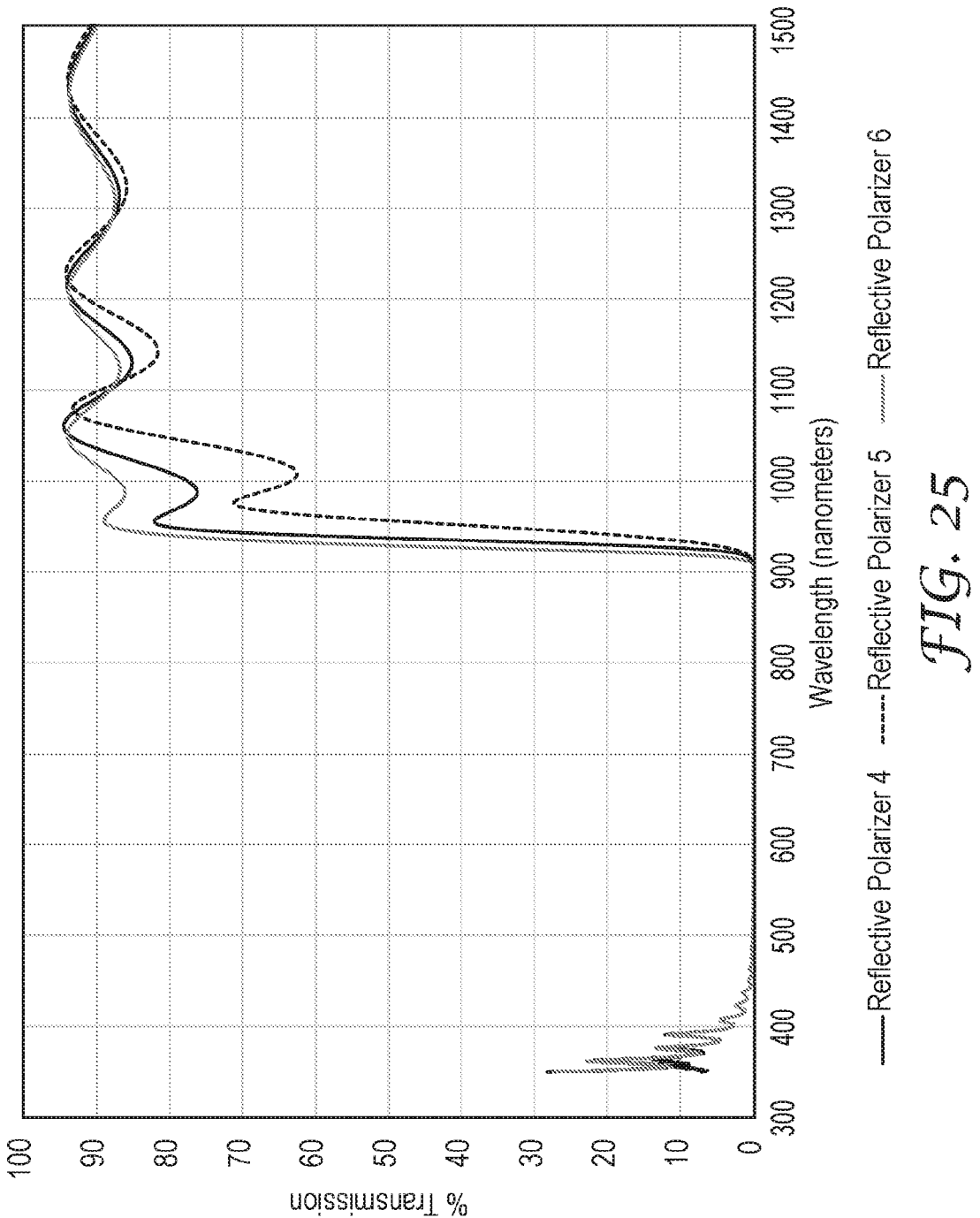
Figure 26:
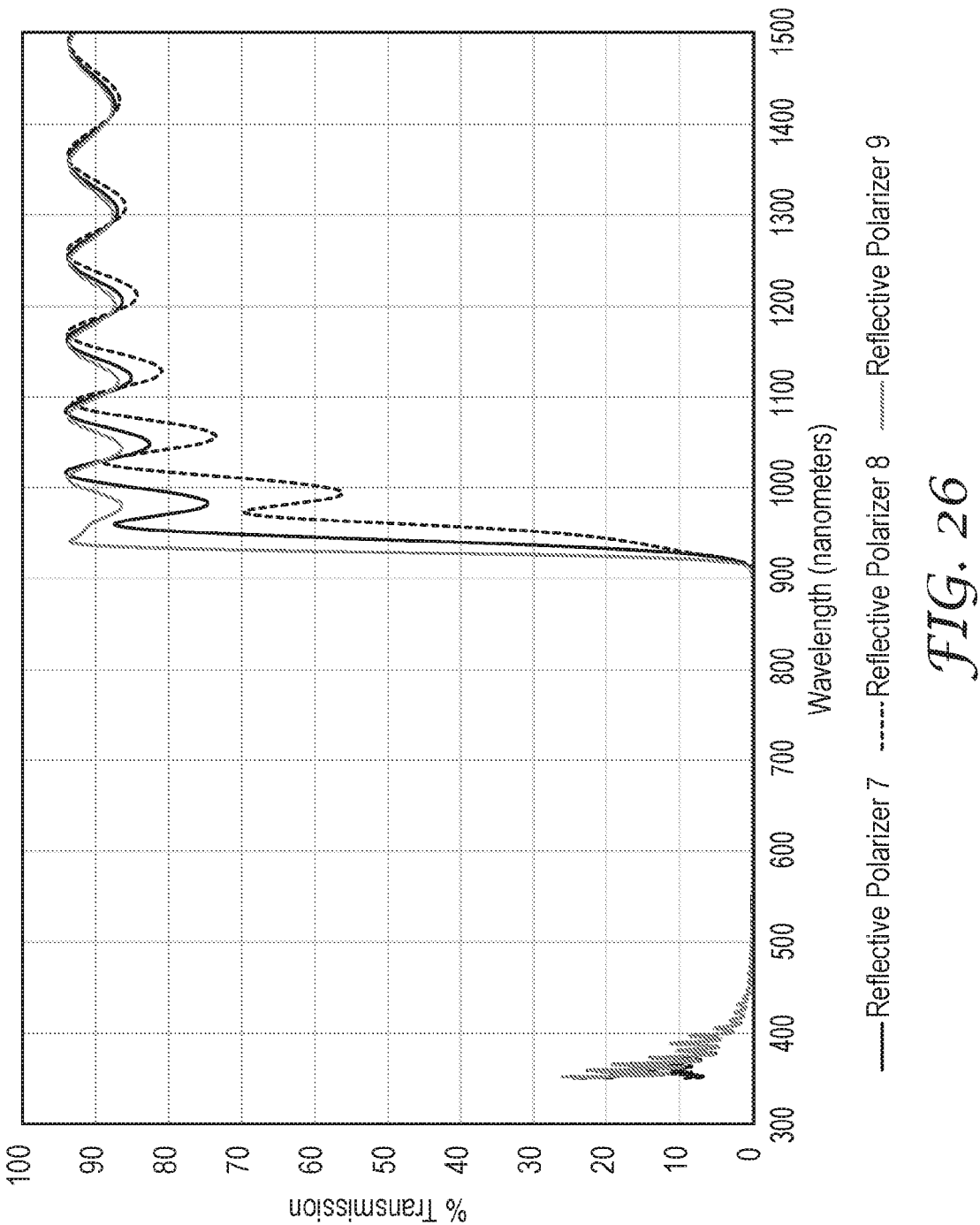

The resulting block state transmission spectra are shown in FIG. 24 for 1.5 micrometer thick skin layers (Reflective Polarizers 1, 2, and 3); FIG. 25 for 2.5 micrometer thick skin layers (Reflective Polarizers 4, 5, and 6); and in FIG. 26 for 5.0 micrometer thick skin layers (Reflective Polarizers 7, 8, and 9).

Figure 27:
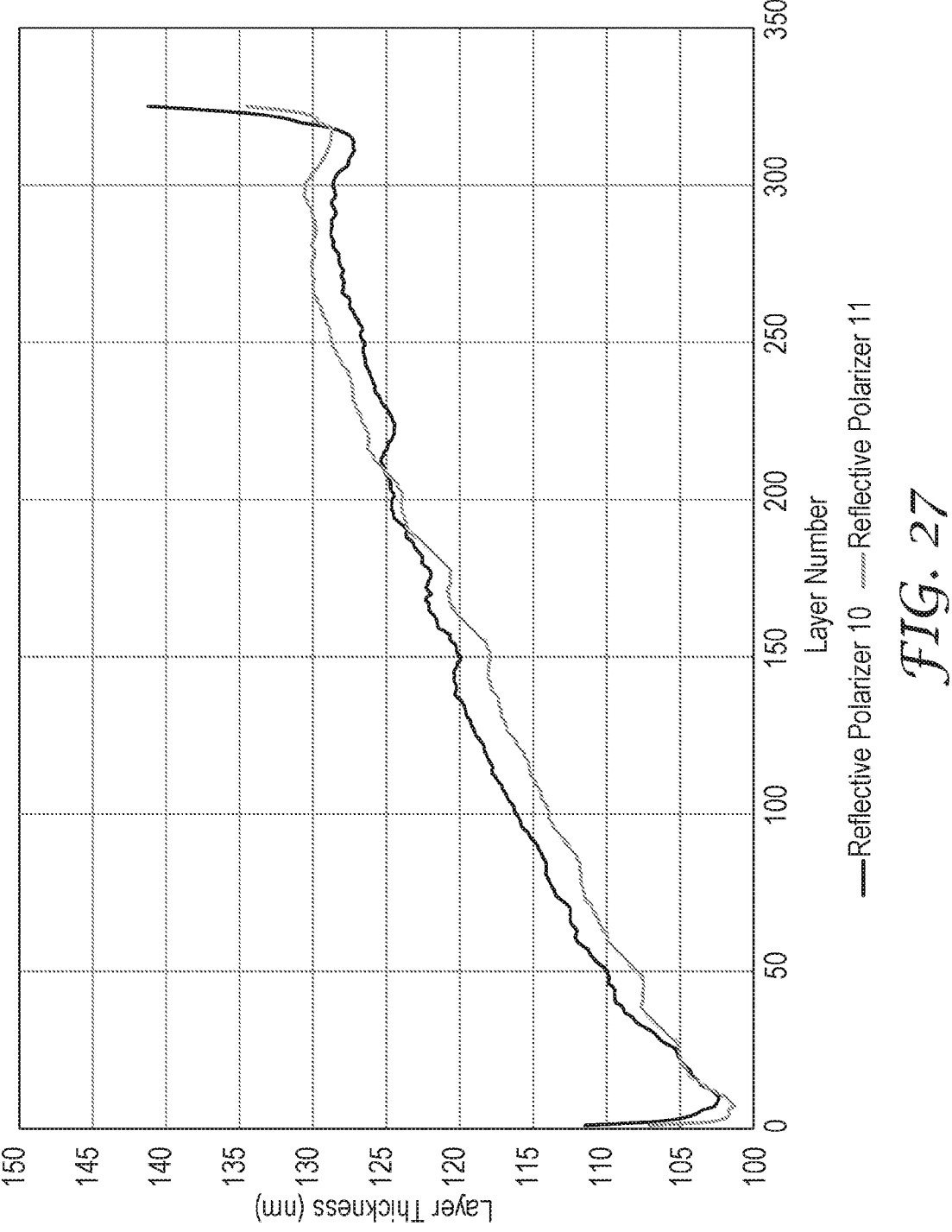
FIG. 27 is a plot of average layer thickness versus layer number for two reflective polarizers.
Figure 28:
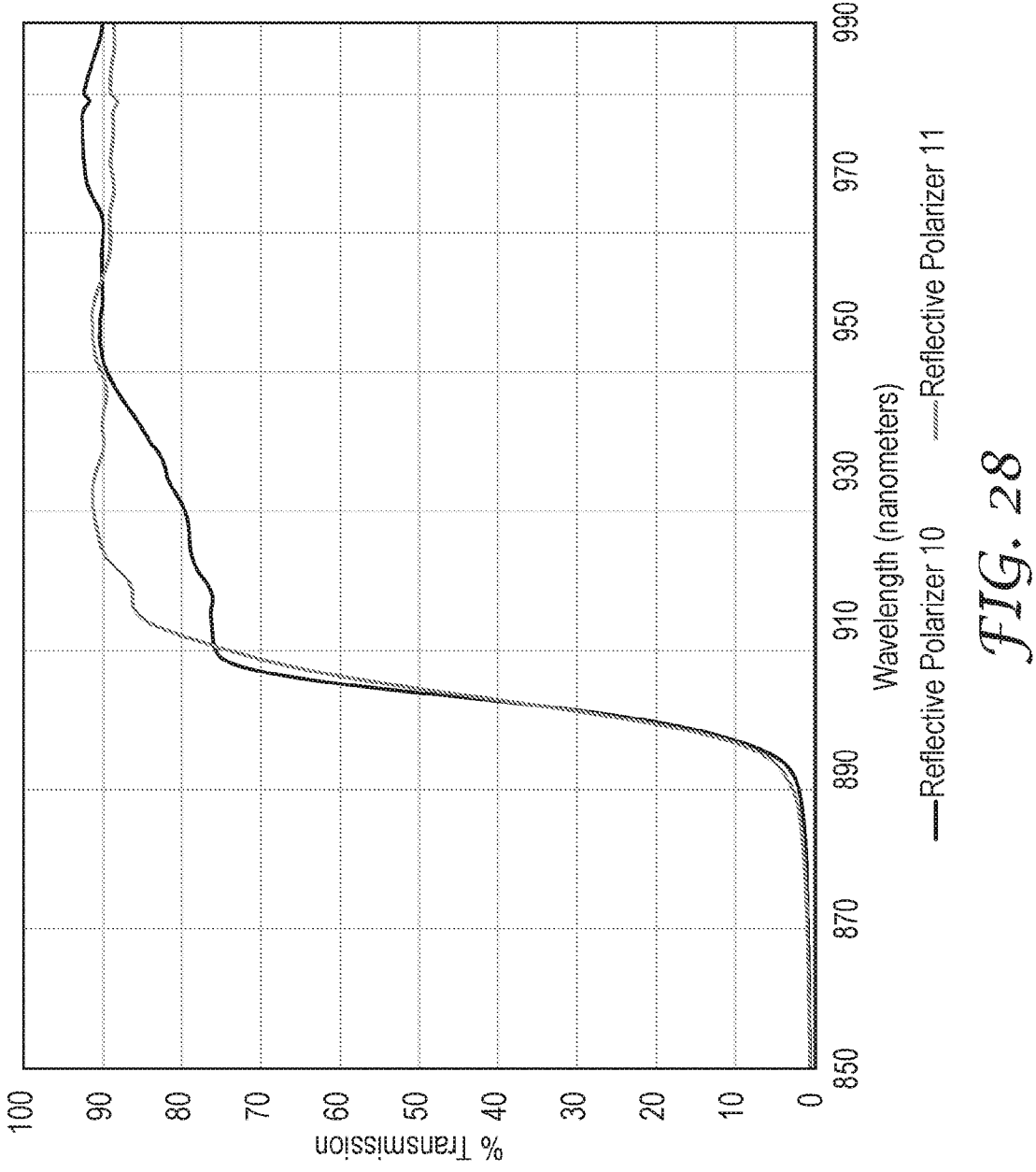
FIG. 28 shows block state transmission spectra for substantially normally incident light for the reflective polarizers of FIG. 27.

FIGS. 27 and 28 show experimental layer thickness profiles and transmission spectra, respectively, for Reflective Polarizers 10 and 11 showing the relationship between layer thickness profile and transmission spectra shape. The materials, layer configuration, and process conditions used to make these films were described above and the layer thickness profiles were measured with the same Atomic Force Microscopy system. The process parameter used to select these layer thicknesses profiles was the axial rod heater power levels in the multi-layer feedblock as described in U.S. Pat. No. 6,783,349 (Neavin et al.). The skin layers were 1.5 micrometers thick for Reflective Polarizers 10 and 11. FIG. 27 shows the measured layer thickness profiles for the last 325 layers delivered by the feedblock system for the two reflective polarizer films. FIG. 28 shows the resulting block state transmission spectra for Reflective Polarizers 10 and 11. Reflective Polarizer 11 had fewer layers having a high positive slope compared to Reflective Polarizer 10. Reflective Polarizer 11 showed higher transmission in for the wavelength range (910 to 950 nm) adjacent to the right band edge than Reflective Polarizer 10.

Mirror films can be made with similar layer thickness profiles as Reflective Polarizers 1-11. The mirror films would be expected to have transmission spectra for each of two orthogonal polarization states similar to the transmission spectra of the corresponding reflective polarizer for the block polarization state.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical film comprising a plurality of polymeric layers arranged along at least a portion of a thickness of the optical film and sequentially numbered from 1 to N, N an integer greater than about 100, the plurality of polymeric layers comprising a polymeric end layer at each end thereof, a plot of an average layer thickness versus a layer number of the plurality of polymeric layers comprising a first knee region separating a left region comprising at least N1 sequentially arranged polymeric layers, N1 an integer greater than about 50, where the polymeric layers have lower layer numbers, from a middle region comprising at least N2 sequentially arranged polymeric layers, N2 an integer greater than about 10, where the polymeric layers have higher layer numbers, such that a linear fit to the at least N1 sequentially arranged polymeric layers in the left region has a positive linear slope having a magnitude of greater than about 0.04 nm per layer number with an r-squared value of greater than about 0.8, and a linear fit to the at least N2 sequentially arranged polymeric layers in the middle region has a negative linear slope having a magnitude of greater than about 0.05 nm per layer number with an r-squared value of greater than about 0.8, the optical film further comprising a second knee region separating the middle region from a right region comprising at least N3 sequentially arranged polymeric layers, N3 an integer greater than about 3, where the polymeric layers have higher layer numbers than the polymeric layers in the middle region, such that a linear fit to the at least N3 sequentially arranged polymeric layers in the right region has a positive linear slope, wherein the positive linear slope of the linear fit to the at least N3 sequentially arranged polymeric layers in the right region has a magnitude of greater than about 1.2 nm per layer number, the linear fit to the at least N3 sequentially arranged polymeric layers in the right region having an r-squared value of greater than about 0.6.

2. The optical film of claim 1, wherein for substantially normally incident light and a first wavelength range extending from about 400 nm to about 800 nm and a second wavelength range extending from about 950 nm to about 1300 nm, the plurality of polymeric layers:

reflects greater than about 80% of the incident light having a first polarization state in the first wavelength range;

transmits greater than about 40% of the incident light having a second polarization state, orthogonal to the first polarization state, in the first wavelength range; and transmits greater than about 60% of the incident light in the second wavelength range for each of the first and second polarization states.

3. The optical film of claim 2, wherein for the second polarization state and the first wavelength range, the optical film has a greater average optical transmittance for light incident at a smaller incident angle and a smaller average optical transmittance for light incident at a greater incident angle.

4. The optical film of claim 1, wherein for a substantially normally incident light having a first polarization state, an optical transmittance of the optical film versus wavelength comprises a band edge between about 850 nm and about 950 nm, such that a best linear fit to the band edge correlating the optical transmittance to the wavelength at least across a wavelength range where the optical transmittance increases from about 10% to about 70% has a slope of greater than about 3%/nm.

5. The optical film of claim 1, wherein the polymeric end layers and each layer therebetween have an average thickness of less than about 300 nm.

6. The optical film of claim 1, wherein at least one layer between the polymeric end layers has an average thickness of greater than about 500 nm.

7. An optical film comprising a plurality of polymeric layers comprising a polymeric end layer at each end thereof, the polymeric end layers and each layer therebetween having an average thickness less than about 300 nm, a plot of an average layer thickness versus a layer number of the plurality of polymeric layers comprising:

a left region comprising at least N4 sequentially arranged polymeric layers, N4 an integer greater than about 5;

a first middle region comprising at least N1 sequentially arranged polymeric layers, N1 an integer greater than about 50;

a second middle region comprising at least N2 sequentially arranged polymeric layers, N2 an integer greater than about 10; and a right region comprising at least N3 sequentially arranged polymeric layers, N3 an integer greater than about 3, such that a linear fit to the at least N4 sequentially arranged polymeric layers in the left region has a negative linear slope having a magnitude of greater than about 0.04 nm per layer number with an r-squared value of greater than about 0.8, a linear fit to the at least N1 sequentially arranged polymeric layers in the first middle region has a positive linear slope having a magnitude of greater than about 0.04 nm per layer number with an r-squared value of greater than about 0.8, a linear fit to the at least N2 sequentially arranged polymeric layers in the second middle region has a negative linear slope having a magnitude of greater than about 0.05 nm per layer number with an r-squared value of greater than about 0.8, and a linear fit to the at least N3 sequentially arranged polymeric layers in the right region has a positive linear slope having a magnitude of greater than about 1.2 nm per layer number with an r-squared value of greater than about 0.6.

8. The optical film of claim 7, wherein:

a first knee region separates the left region from the first middle region, where the polymeric layers in the first middle region have higher layer numbers than the polymeric layers in the left region;

a second knee region separates the first middle region from the second middle region, where the polymeric layers in the second middle region have higher layer numbers than the polymeric layers in the first middle region; and a third knee region separates the second middle region from the right region, where the polymeric layers in the right region have higher layer numbers than the polymeric layers in the second middle region.

9. The optical film of claim 7, wherein for substantially normally incident light and a first wavelength range extending from about 400 nm to about 800 nm and a second wavelength range extending from about 950 nm to about 1300 nm, the plurality of polymeric layers:

reflects greater than about 80% of the incident light having a first polarization state in the first wavelength range;

transmits greater than about 40% of the incident light having a second polarization state, orthogonal to the first polarization state, in the first wavelength range; and transmits greater than about 60% of the incident light in the second wavelength range for each of the first and second polarization states.

10. The optical film of claim 7, wherein for substantially normally incident light and a first wavelength range extending from about 400 nm to about 800 nm and a second wavelength range extending from about 950 nm to about 1300 nm, the plurality of polymeric layers:

reflects greater than about 80% of the incident light in the first wavelength range for each of orthogonal first and second polarization states; and transmits greater than about 60% of the incident light in the second wavelength range for each of the first and second polarization states.

11. An optical film comprising a plurality of polymeric layers arranged along at least a portion of a thickness of the optical film and sequentially numbered from 1 to N, N an integer greater than about 100, the plurality of polymeric layers comprising a polymeric end layer at each end thereof, the polymeric end layers and each layer therebetween having an average thickness less than about 300 nm, an mth layer in the plurality of the polymeric layers having an average thickness tm, m<N, such that an average thickness of each polymeric layer in the plurality of polymeric layers having a layer number n, m≤n≤N, is within about 10% of:

$$tm - A\ e^{\frac{-(N-n)}{d}},$$

where A is a real number, 0.01 tm≤A≤0.25 tm, and dis an integer, 0.005N≤d≤0.1N.

12. The optical film of claim 11, wherein the average thickness of each polymeric layer in the plurality of polymeric lavers having a layer number n, m≤n≤Nis within about 5% of $$tm - A\ e^{\frac{-(N-n)}{d}}.$$

13. The optical film of claim 11, wherein N−m≥5.

14. The optical film of claim 11, wherein for substantially normally incident light and a first wavelength range extending from about 400 nm to about 800 nm and a second wavelength range extending from about 950 nm to about 1300 nm, the plurality of polymeric layers:
    reflects greater than about 80% of the incident light having a first polarization state in the first wavelength range; and
    transmits greater than about 60% of the incident light in the second wavelength range for each of the first polarization state and an orthogonal second polarization state.

15. An optical film comprising a plurality of polymeric layers arranged along at least a portion of a thickness of the optical film and sequentially numbered from 1 to N, N an integer greater than about 200, the plurality of polymeric layers comprising a polymeric end layer at each end thereof, the polymeric end layers and each layer therebetween having an average thickness less than about 300 nm, a plot of an average layer thickness versus a layer number of the plurality of polymeric layers comprising a knee region separating a left region comprising at least 100 sequentially arranged polymeric layers where the polymeric layers have lower layer numbers, from a right region comprising at least 10 sequentially arranged polymeric layers where the polymeric layers have higher layer numbers, such that a third order polynomial fit to at least 15 sequentially arranged polymeric layers comprising the knee region has a positive third order coefficient and a negative second order coefficient with an r-squared value of greater than about 0.8.

16. The optical film of claim 15, wherein for substantially normally incident light and a first wavelength range extending from about 400 nm to about 800 nm, the optical film:
    reflects greater than about 80% of the incident light having a first polarization state in the first wavelength range; and
    transmits greater than about 40% of the incident light having a second polarization state, orthogonal to the first polarization state, in the first wavelength range.

17. The optical film of claim 16, wherein for substantially normally incident light and a second wavelength range extending from about 950 nm to about 1300 nm, the optical film transmits greater than about 60% of the incident light in the second wavelength range for each of the first and second polarization states.

18. The optical film of claim 15, wherein for substantially normally incident light and a first wavelength range extending from about 400 nm to about 800 nm and a second wavelength range extending from about 950 nm to about 1300 nm, the plurality of polymeric layers:
    reflects greater than about 80% of the incident light in the first wavelength range for each of orthogonal first and second polarization states; and
    transmits greater than about 60% of the incident light in the second wavelength range for each of the first and second polarization states.

* * * * *